US012049018B2

(12) United States Patent
Das et al.

(10) Patent No.: US 12,049,018 B2
(45) Date of Patent: Jul. 30, 2024

(54) MOLDED FIBER CUTLERY

(71) Applicant: World Centric, Rohnert Park, CA (US)

(72) Inventors: Aseem Das, Petaluma, CA (US); Viktor Jondal, Täby (SE); Jesse Menayan, Sausalito, CA (US); Yanghua Ye, Jiangxi (CN)

(73) Assignee: World Centric, Rohnert Park, CA (US)

( * ) Notice: Subject to any disclaimer, the term of this patent is extended or adjusted under 35 U.S.C. 154(b) by 0 days.

(21) Appl. No.: 18/307,551

(22) Filed: Apr. 26, 2023

(65) Prior Publication Data

US 2023/0276970 A1 Sep. 7, 2023

Related U.S. Application Data

(62) Division of application No. 17/198,881, filed on Mar. 11, 2021, now Pat. No. 11,696,659.

(51) Int. Cl.

| | |
|---|---|
| ***B26B 3/02*** | (2006.01) |
| ***A47G 21/02*** | (2006.01) |
| ***A47G 21/04*** | (2006.01) |
| ***B26B 9/02*** | (2006.01) |

(52) U.S. Cl.

CPC ................ *B26B 3/02* (2013.01); *A47G 21/02* (2013.01); *A47G 21/023* (2013.01); *A47G 21/04* (2013.01); *B26B 9/02* (2013.01); *A47G 2400/10* (2013.01)

(58) Field of Classification Search

CPC .... B26B 3/00; B26B 3/02; B26B 9/00; B26B 9/02

USPC ............ D7/401.2, 649; 30/340, 342, 346.56, 30/355; D8/99

See application file for complete search history.

(56) References Cited

U.S. PATENT DOCUMENTS

| | | | | |
|---|---|---|---|---|
| 422,724 A * | 3/1890 | Carter | B26B 9/02 | 30/355 |
| 437,325 A * | 9/1890 | Barclay | B26B 9/02 | 30/355 |
| 542,583 A * | 7/1895 | Ball | B26B 9/02 | 30/355 |
| 592,961 A * | 11/1897 | Brooks | B26B 9/02 | 30/355 |

(Continued)

FOREIGN PATENT DOCUMENTS

| | | |
|---|---|---|
| CN | 201530509026 | 12/2015 |
| CN | 202030594546.0 | 9/2020 |

(Continued)

OTHER PUBLICATIONS

CPLA Disposable Forks at Amazon.com, reciting a date of Sep. 7, 2017, [site purportedly visited Mar. 10, 2022]. Available from internet, URL: < https ://www.amazon.com/Earths-Natural-Alternative-Disposable-Cutlery/dp/B07 5GHFD8 P/> (Year: 2017).

(Continued)

*Primary Examiner* — Jason Daniel Prone
(74) *Attorney, Agent, or Firm* — Sterne, Kessler, Goldstein & Fox P.L.L.C.

(57) ABSTRACT

The present disclosure is directed to biodegradable cutlery, and more specifically to spoons, forks, and knives. The biodegradable cutlery includes a plurality of recesses disposed on the handle forming a rib to resist twisting and bending. An indentation may be disposed along a neck of the cutlery to enhance stability further.

9 Claims, 30 Drawing Sheets

(56) References Cited

U.S. PATENT DOCUMENTS 818,263 A * 4/1906 Kingsley ................... B26B 9/00
30/353
1,150,850 A 8/1915 Comstock, Sr.
1,211,062 A 1/1917 Bowman
1,227,234 A * 5/1917 Bacon ....................... B26B 9/02
30/355
D58,807 S 8/1921 Mallory
1,435,890 A 11/1922 Bothe
1,460,700 A 7/1923 Buffington
1,489,419 A * 4/1924 Beechlyn .................. B26B 9/02
30/348
1,504,501 A * 8/1924 Pope ......................... B26B 9/00
30/355
D67,714 S 6/1925 Momberger
1,793,171 A * 2/1931 Grant ........................ B26B 9/02
30/355
1,818,296 A 8/1931 Bothe
1,851,942 A 3/1932 Christie
1,907,737 A 5/1933 Christie
D100,156 S * 6/1936 Ellingwood ................... D7/649
2,075,310 A * 3/1937 Sprague, Jr. .............. B26B 9/02
30/340
D112,590 S * 12/1938 MacPherson .................. D7/649
2,185,942 A 1/1940 Frank
2,216,005 A 9/1940 Goldstein
2,279,833 A * 4/1942 Madan ...................... B26B 9/00
D7/649
2,315,898 A * 4/1943 Krilow ...................... B26B 9/02
D7/650
2,328,320 A 8/1943 Baruch et al.
2,440,136 A 4/1948 Barnes
D150,323 S 7/1948 Stratton
D164,163 S * 8/1951 Gorton ...................... D8/DIG. 3
2,566,112 A * 8/1951 Barnard .................... B26B 9/00
30/348
2,760,266 A * 8/1956 Sanders .................... B26B 9/02
76/104.1
2,803,876 A * 8/1957 Nelson ...................... B26B 9/00
30/115
D182,512 S * 4/1958 Harper ...................... D8/DIG. 3
2,958,943 A * 11/1960 Koe .......................... B26B 9/00
30/115
D190,250 S 5/1961 Latham
3,035,344 A * 5/1962 Brown ...................... B26B 9/02
30/115
3,574,937 A * 4/1971 Wolfe ....................... B26B 9/00
D7/650
3,609,865 A 10/1971 Golden
3,842,501 A * 10/1974 Honma ..................... B26B 9/02
30/286
4,399,611 A * 8/1983 Maringer .................. B26B 9/00
D7/649
4,524,512 A 6/1985 Formo et al.
D291,400 S * 8/1987 Pedrini .......................... D7/649
4,823,467 A * 4/1989 Campbell ................. B26B 9/02
D7/649
D306,956 S * 4/1990 Kawasaki ...................... D7/649
4,967,477 A * 11/1990 Sanford .................... B26B 9/02
30/314
4,984,367 A 1/1991 Albanese
5,075,975 A 12/1991 Wilson
5,241,883 A * 9/1993 Coppier .................... B26B 9/00
30/346
D350,260 S * 9/1994 Weaver .......................... D7/649
D362,160 S 9/1995 Brabeck et al.
D388,664 S 1/1998 Gagnon et al.
5,975,909 A 11/1999 Ritchie
D424,380 S * 5/2000 McCatty ........................ D7/649
6,408,524 B1 6/2002 Lai
D487,379 S * 3/2004 Porsche ......................... D7/649
6,701,625 B1 3/2004 Thomason et al.
D499,940 S 12/2004 Shane-Schuldt
D530,987 S 10/2006 Lee
D531,860 S 11/2006 Lee
D546,136 S 7/2007 Smith et al.
D552,431 S 10/2007 Hsin-Hung
D555,432 S 11/2007 Gartz
D557,083 S 12/2007 Medling et al.
D579,733 S 11/2008 Richmond
D600,981 S 9/2009 Holcomb
D607,286 S 1/2010 Junko
D614,921 S 5/2010 Bardolet
D620,749 S 8/2010 Junko
D621,210 S 8/2010 Claps
D623,484 S 9/2010 Lenge
D623,907 S * 9/2010 Lenge ............................ D7/649
D642,874 S 8/2011 McFarland
D643,256 S * 8/2011 Hirai .............................. D7/649
D643,257 S * 8/2011 Hirai .............................. D7/649
D657,620 S * 4/2012 Pookrum .................... D7/401.2
D675,868 S 2/2013 Liming et al.
D675,869 S 2/2013 Gallop
D692,731 S * 11/2013 Solari ............................ D7/649
D694,064 S * 11/2013 Costa ............................. D7/649
D717,111 S 11/2014 Wang
8,992,289 B2 * 3/2015 Ramos ...................... B26B 9/02
452/132
D742,180 S * 11/2015 Van Wemmel ................ D7/649
D742,181 S * 11/2015 Bucks ............................ D7/649
D742,701 S * 11/2015 Bucks ............................ D7/649
D746,645 S * 1/2016 Truog ............................ D7/649
D758,796 S 6/2016 Miller
9,549,626 B2 1/2017 Truog et al.
D781,666 S * 3/2017 Mishan .......................... D7/649
D790,288 S * 6/2017 Singer ............................ D7/649
D810,517 S * 2/2018 Singer ............................ D7/649
D834,887 S 12/2018 Miksovsky
D836,391 S * 12/2018 Liming .......................... D7/649
D836,392 S * 12/2018 Liming .......................... D7/649
D849,475 S * 5/2019 Liming .......................... D7/649
D903,411 S * 12/2020 Srour ............................. D7/649
10,959,555 B2 3/2021 Lee
D915,836 S * 4/2021 Henderson ..................... D7/649
D931,690 S 9/2021 Das et al.
D931,691 S 9/2021 Das
11,123,886 B1 * 9/2021 Park .......................... B26B 3/00
D932,848 S 10/2021 Jondal et al.
D932,850 S 10/2021 Jondal et al.
D933,431 S 10/2021 Das et al.
D934,627 S 11/2021 Carson
11,253,091 B2 2/2022 Moran
D946,349 S * 3/2022 Carson ........................ D7/401.2
D959,927 S 8/2022 Hong et al.
D959,928 S 8/2022 Hong et al.
D962,722 S * 9/2022 Huang ........................... D7/649
D962,725 S 9/2022 Jondal et al.
11,696,659 B2 * 7/2023 Das ........................... B26B 9/02
30/314
D998,425 S * 9/2023 Schmidt ......................... D7/649
D999,029 S * 9/2023 Schmidt ......................... D7/649
D1,001,612 S * 10/2023 Cuffaro ............................ D8/99
D1,002,294 S * 10/2023 Murad ........................... D7/649
2005/0066531 A1 3/2005 Hougland
2005/0155229 A1 7/2005 Lee
2007/0000136 A1 1/2007 Allen et al.
2008/0016704 A1 * 1/2008 Haneda ..................... B26B 9/02
30/357
2008/0276467 A1 * 11/2008 Schmidt .................... B26B 9/02
30/353
2010/0212166 A1 * 8/2010 Visnack .................... B26B 9/00
30/346
2010/0251554 A1 * 10/2010 Chien ....................... B26B 9/00
30/346
2012/0198707 A1 * 8/2012 Blacken .................... B26B 9/00
30/346
2012/0324741 A1 12/2012 Pookrum
2013/0152406 A1 6/2013 McFarland
2014/0317940 A1 * 10/2014 Scobie ...................... B26B 9/00
30/346
2017/0340152 A1 11/2017 Lee
2017/0341244 A1 * 11/2017 Chen ......................... B26B 3/02

(56) References Cited

U.S. PATENT DOCUMENTS

| | | | | |
|---|---|---|---|---|
| 2017/0348863 A1* | 12/2017 | Kommer | B26B 9/00 |
| 2019/0160697 A1* | 5/2019 | Henry | B26B 9/00 |
| 2020/0139563 A1* | 5/2020 | Betancourt | B26B 9/00 |
| 2020/0163475 A1 | 5/2020 | Moran | |
| 2021/0007520 A1 | 1/2021 | Horton | |
| 2023/0050474 A1* | 2/2023 | Schmidt | B26B 9/00 |
| 2023/0284808 A1* | 9/2023 | Das | B26B 9/02 30/314 |

FOREIGN PATENT DOCUMENTS

| | | |
|---|---|---|
| CN | 112450691 A | 3/2021 |
| EM | 008015259-0002 | 6/2020 |
| GB | 9007733761-0001 | 3/2020 |

OTHER PUBLICATIONS

Transitions2earth Compostable Forks at Amazon.com, reciting a date of Aug. 8, 2018, [site purportedly visited Mar. 10, 2022]. Available from internet, URL: <https ://www.amazon.com/Transitions2earth-Compostable-Forks-Plant-Purchased/dp/B07G BJ6S3 F?th = 1 > (Year: 2018).

World Centric Fiber Forks posted at goodstartpackaging.com (date not available) [site purportedly visited Mar. 10, 2022]. Available from internet, URL: <https://www.goodstartpackaging.com/6-inch-fiber-forks-FO-FB-6-LF/> (Year: NA).

International Search Report and Written Opinion of the International Searching Authority directed to related International Patent Application No. PCT/US22/17886 mailed Jul. 7, 2022, 12 pages.

* cited by examiner

MOLDED FIBER CUTLERY

CROSS REFERENCE TO RELATED APPLICATIONS

This application is a divisional of U.S. application Ser. No. 17/198,881, now U.S. Pat. No. 11,696,659, filed Mar. 11, 2021, the disclosure of which is incorporated by reference in its entirety.

FIELD

The described embodiments relate generally to cutlery, including forks, knives and spoons. More particularly, embodiments relate to molded fiber cutlery having one or more geometric aspects to reinforce the strength and stability of the cutlery.

BACKGROUND

Disposable plastic cutlery is commonly used in restaurants, commercial settings, or catered events. Plastic cutlery can typically be provided at relatively low cost, while still possessing enough strength to retain, scoop, or cut. The plastic materials commonly used for disposable cutlery, however, are not biodegradable. Accordingly, widespread use of plastic cutlery has led to plastic pollution and environmental degradation.

While current trends are pushing for implementing reusable and sustainable materials, biodegradable materials have not been entirely successful in replacing the plastic used to make disposable cutlery due to their lack of stiffness. For example, molded fiber has been used as an environmentally friendly alternative to plastic and other non-reusable materials for containers such as egg cartons. But molded fiber has an inherent flexibility that is susceptible to bending and twisting, especially when configured as a spoon, fork, knife or other cutlery. Thus, molded fiber cutlery typically cannot retain or cut without twisting or bending rendering it less than effective for use. Accordingly, the need exists for cutlery that can be made from biodegradable material, such as molded fiber, while still possessing adequate rigidity and strength to retain or cut without twisting or bending.

SUMMARY

The present disclosure includes embodiments of a biodegradable cutlery that includes a spoon, a fork, and a knife. In an embodiment, a biodegradable spoon may include a handle having a convex top wall, a neck having a convex top wall extending from an end of the handle, a concave bowl extending from the neck, a plurality of recesses disposed on a right side of the convex top wall of the handle and a plurality of recesses disposed on a left side of the convex top wall of the handle. The plurality of recesses may be disposed on the right and left sides of the convex top wall and each may include a curved inner sidewall extending downwardly from the convex top wall. A bottom wall may extend laterally from a lower end of the curved inner sidewall. The biodegradable spoon may include a rib formed in the convex top wall by the curved inner sidewalls of the recesses. The rib may undulate along a length of the handle. The biodegradable spoon may include an indentation disposed along the neck and the bowl to add stability to the spoon when a load is applied on the bowl. The indentation may include a concave base disposed below the convex top wall. The handle, the neck, and the concave bowl may be unitary and may be made of a molded fiber material.

In some embodiments of a spoon, a flange may extend along a perimeter of the handle and the neck and converge at a rim of the concave bowl. An outer sidewall may project upwardly from the flange to a lower end of the convex top wall of the handle and the neck. The bottom wall of each recess may be disposed on the right and left sides of the convex top wall extend to the outer sidewall. The recesses disposed on the right side of the handle may be offset with respect to the recesses disposed on the left side of the handle. The base of the indentation may be oval-shaped and may have a concave surface extending from a first end adjacent to the end of the handle to a second end disposed along the bowl.

In some embodiments, a biodegradable fork may include a handle having a convex top wall and a concave bottom wall. The biodegradable fork may include a neck having a convex top wall extending from an end of the handle and a concave base extending from the convex top wall of the neck. The biodegradable fork may include a plurality of tines extending from the neck. Each of the tines may have a concave bottom surface and flat tip. The biodegradable fork may include a plurality of hollow ridges with each ridge extending along the neck and one of the tines, and terminating proximate to the flat tip of the tine. A plurality of recesses may be disposed on one of the convex top wall and the concave bottom wall of the handle to disrupt forces applied orthogonally against the handle. A rib may be formed by the recesses. An indentation may be disposed along the neck to add stability to the fork when in use. The indentation may include a concave base disposed below the convex top wall. The handle, the neck, and the plurality of tines may be unitary and may be made of a molded fiber material.

In some embodiments of the fork, the indentation may be oval-shaped and may extend from an upper surface of the convex top wall of the neck to the base of the neck. The plurality of recesses may include a plurality of recesses disposed on a right side of the handle and a plurality of recesses disposed on a left side of the handle. The plurality of recesses disposed on the right and left sides of the handle may each include a curved inner sidewall extending downwardly from the handle and a bottom wall extending laterally from a lower end of the curved inner sidewall. The rib may be formed by the curved inner sidewalls of the recesses, and the rib may undulate along a length of the handle.

In some embodiments, a biodegradable knife may include a handle having a convex top wall and a concave bottom wall. The biodegradable knife may include a neck having a convex top wall extending from an end of the handle and a concave base extending from the convex top wall of the neck. The biodegradable knife may include a blade having a convex top wall extending from the neck and along a first side and a second side of the blade. The biodegradable knife may include a serrated edge projecting outwardly from a first side of the blade. An indentation may extend along the blade and may include a concave base disposed below the convex top wall. A plurality of recesses may be disposed on one of the convex top wall and the concave bottom wall of the handle to disrupt forces applied orthogonally against the handle. A handle rib may be formed in the convex top wall by the recesses. The handle, the neck, and the blade may be unitary and may be made of a molded fiber material.

In some embodiments, the biodegradable knife may include a plurality of blade recesses disposed on a right side of the base of the indentation and a plurality of blade recesses disposed on a left side of the base of the indentation. The plurality of blade recesses may be disposed on the right and left sides of the base, and each may include a curved inner sidewall extending downwardly from the base and a bottom wall extending laterally from a lower end of the curved inner sidewall.

In some embodiments, the biodegradable knife may include a blade rib formed in the base by the curved inner sidewall of the blade recesses. The blade rib may undulate along a length of the base. The convex top wall of the blade may have a flat upper surface disposed along a tip of the blade and a rounded upper surface disposed along an end of the blade adjacent to the neck. A height of the convex top wall of the blade may taper along the first and second sides of the blade. The serrated edge may include a plurality of teeth inclining downwardly from the first side of the blade. A flange may extend along a perimeter of the handle, the neck, and the second side of the blade. The convex top wall of the blade may project upwardly from the flange, and the bottom walls of the blade recesses may be disposed below the flange. The plurality of recesses may include a plurality of recesses disposed on a right side of the convex top wall of the handle and a plurality of recesses disposed on a left side of the convex top wall.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
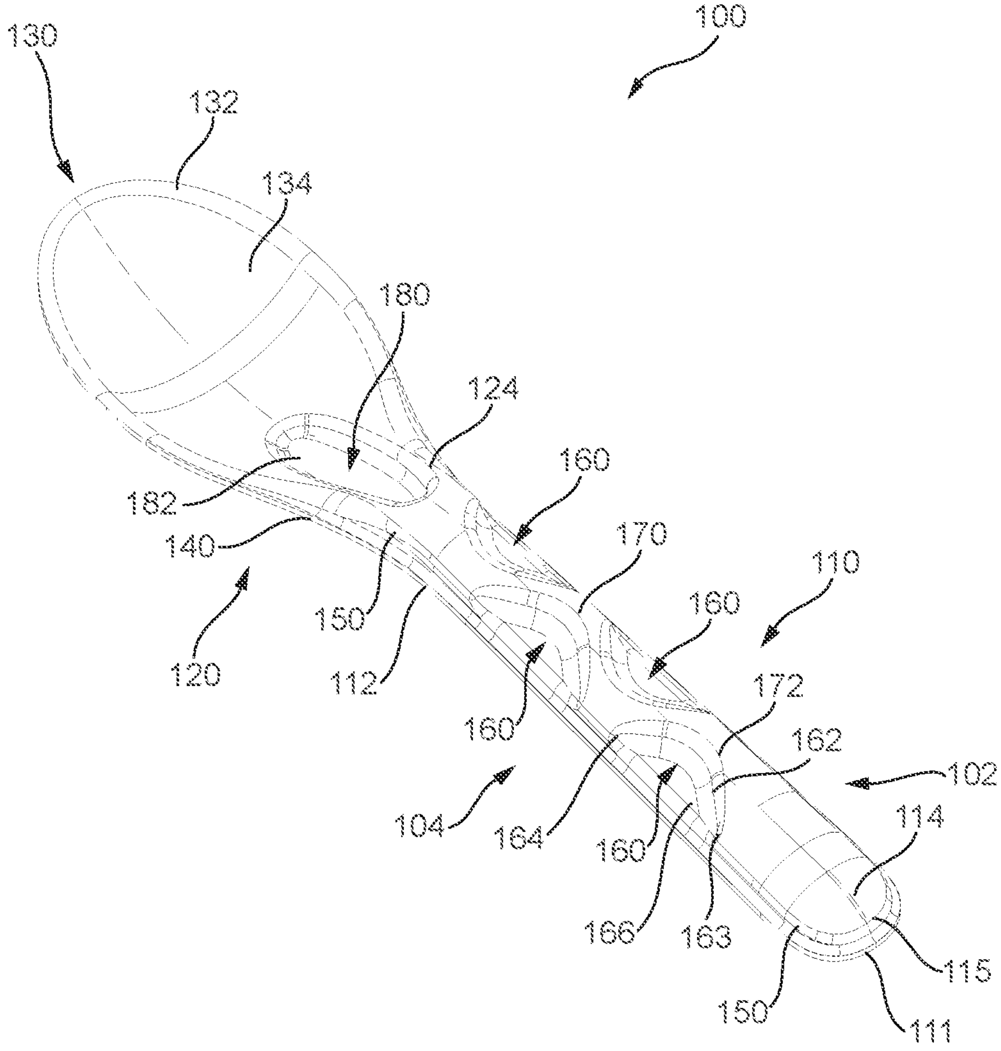
FIG. 1 shows a top perspective view of a molded fiber spoon according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "an embodiment," "embodiments," etc., indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

Biodegradable materials, such as molded fiber, typically lack the stiffness needed to resist torsion and deflection. Therefore, cutlery made from molded fiber can be too flexible to scoop, pierce, or cut without the handle twisting or the implement portion of the cutlery bending, making it difficult to properly use the cutlery for its intended purpose.

According to embodiments described herein, the molded fiber of the present disclosure may overcome the deficiencies noted above by including one or more geometric aspects that reinforce the stress points of the cutlery with added stability and rigidity. This allows the cutlery to inhibit torsion and deflection, ultimately allowing the cutlery to be used for scooping, cutting, and piercing typical food items without twisting or bending.

According to the embodiments described herein, cutlery can be made from a biodegradable material, such as, for example, molded fiber. In the context of the present disclosure, a biodegradable material may refer to a compostable material that can be disintegrated into its natural elements via a biological decomposition process. The molded fiber material may include a blend of one or more natural raw materials, such as, for example, a pulp processed from sugarcane, bamboo, wood, wheat straw, rice straw, sorghum, and the like. The molded fiber material may include a blend of sugar cane pulp and bamboo pulp, for example, a composition having sugar cane pulp ranging from approximately 30% to approximately 80% by mass, such as, for example 60% by mass; and bamboo pulp ranging from approximately 20% to approximately 60% by mass, such as, for example, 40% by mass. These ranges allow the molded fiber cutlery to have a sufficient degree of strength and stiffness suitable for scooping, cutting, and piercing a food item. The molded fiber material may include a blend of short fibers (e.g., ranging from approximately 0.5 mm to approximately 1.2 mm) and long fibers (e.g., ranging from approximately 1.2 mm to approximately 4.0 mm). For example, the molded fiber material may include approximately 60% by mass of short fibers, such as fibers from sugar cane pulp, and 40% by mass of long fibers, such as fibers from bamboo pulp. The mass percentage ratio of short to long fibers allows the molded fiber cutlery to have sufficient strength and stiffness suitable for scooping, cutting, and piercing.

According to the embodiments described herein, the molded fiber cutlery may include a material thickness that ranges from approximately 0.7 mm to approximately 1.4 mm. This range of material thickness allows the molded fiber cutlery to be thin enough for scooping or piercing, while also having an adequate thickness to withstand forces applied to cutlery when used to scoop, cut or pierce a typical food item.

Embodiments will now be described in more detail with reference to the figures. With reference to FIGS. 1-10, molded fiber cutlery may include a spoon shown generally at 100. Spoon 100 may include an elongated handle shown generally at 110, a neck shown generally at 120 extending from handle 110, and a rounded concave bowl shown generally at 130 extending from neck 120. Handle 110, neck 120, and bowl 130 can be unitary such that handle 110, neck 120, and bowl 130 are integrally made from the same material, such as, for example, molded fiber material.

Figure 2:
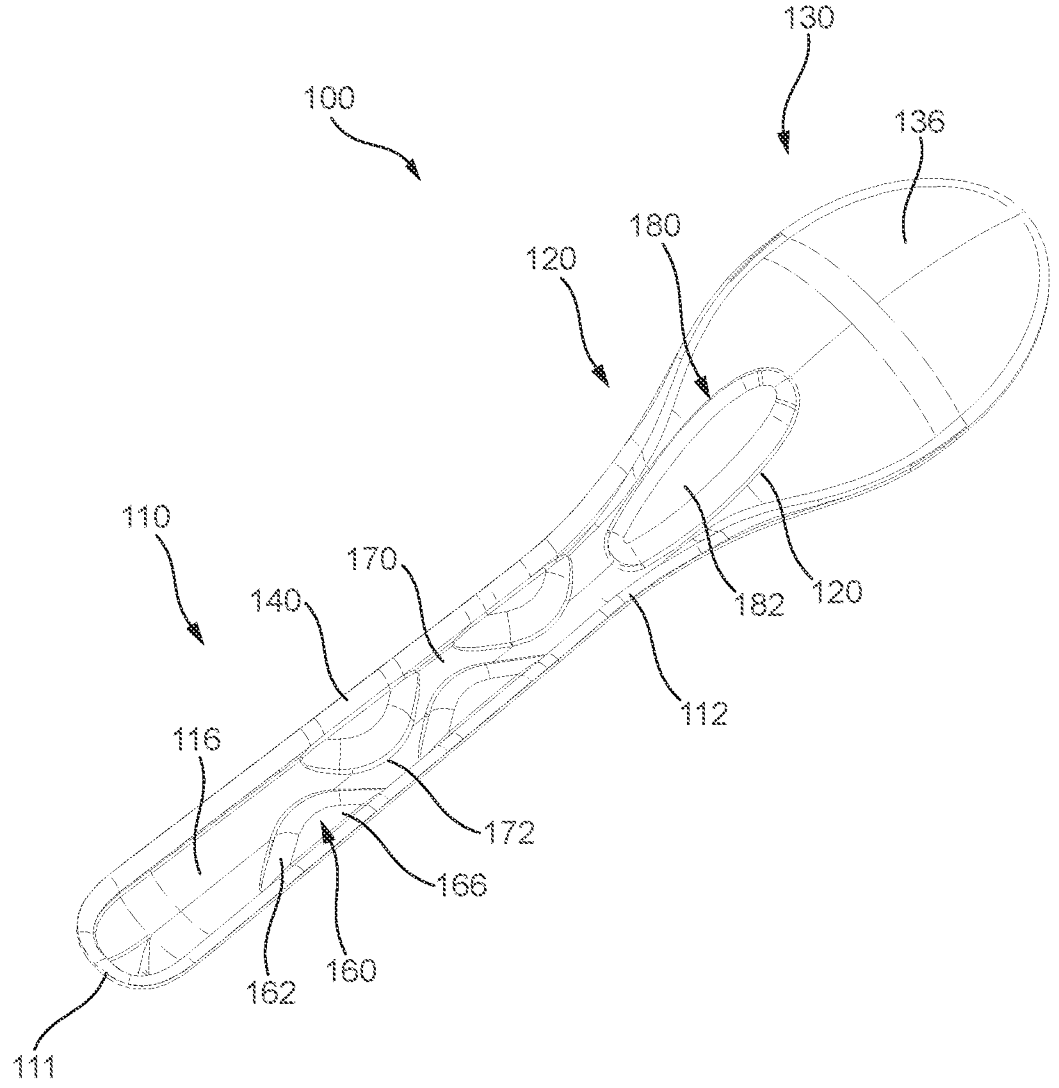
FIG. 2 shows a bottom perspective bottom view thereof.
Figure 3:
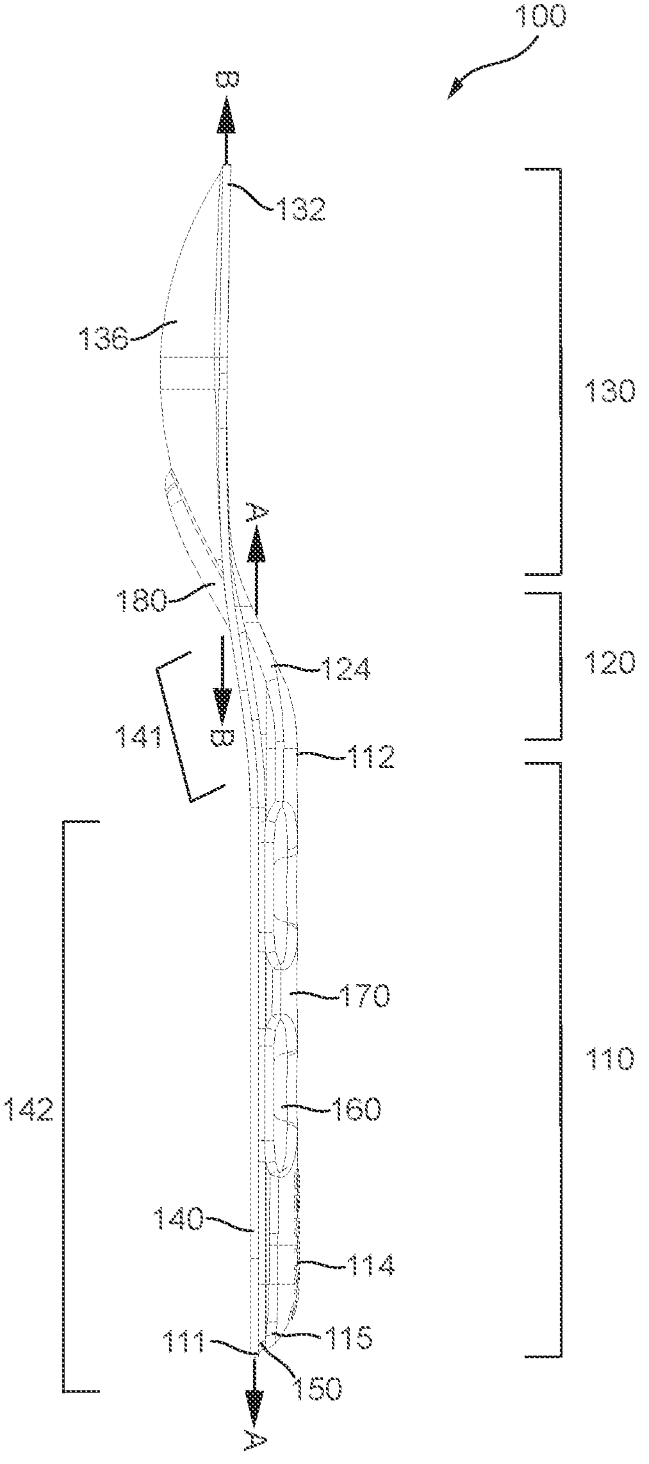
FIG. 3 shows a side view thereof.
Figure 5:
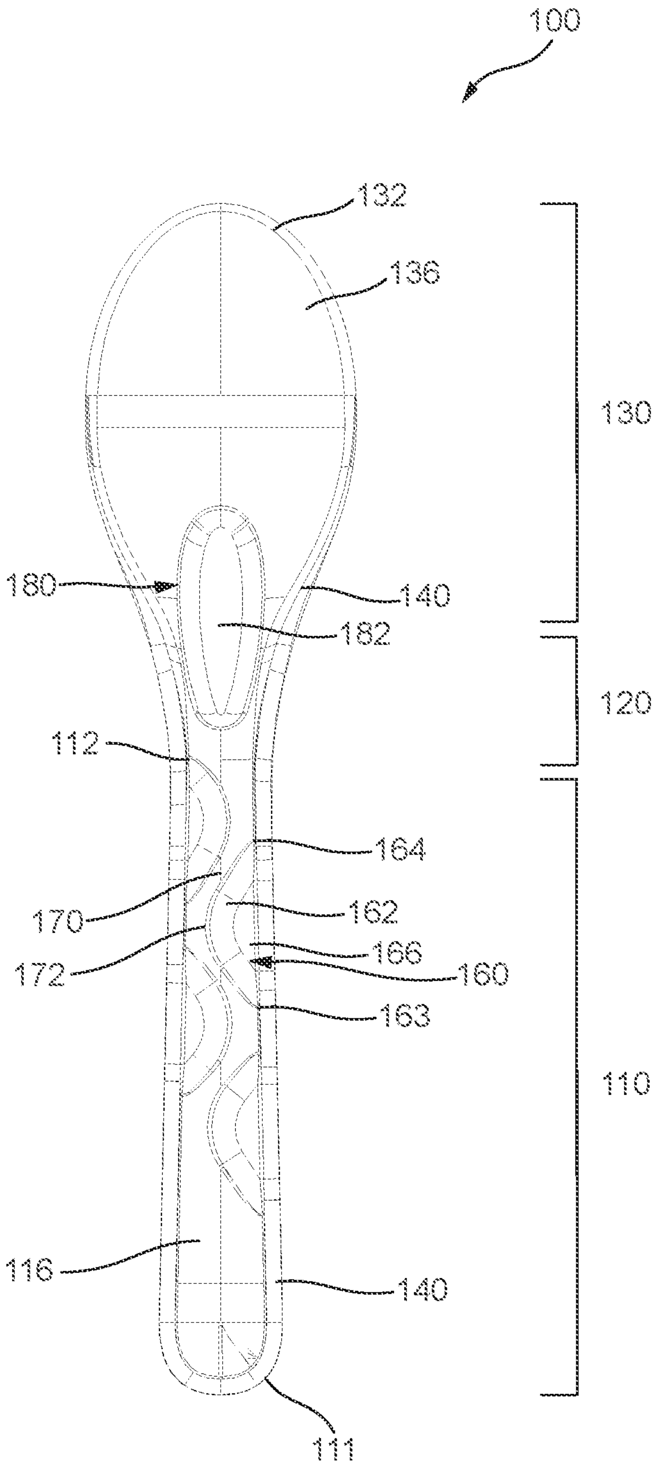
FIG. 5 shows a bottom view thereof.
Figure 6:
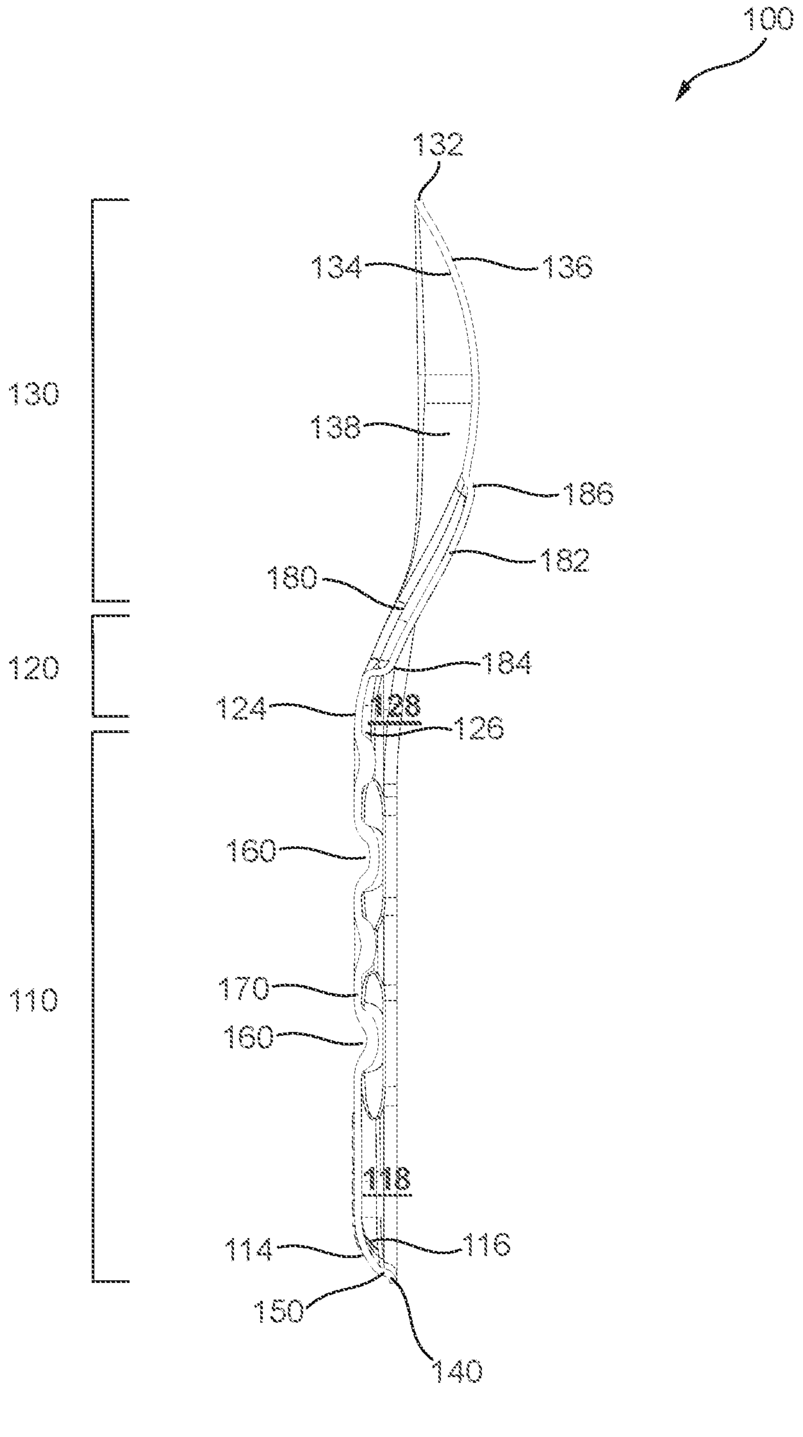
FIG. 6 shows a longitudinal cross-sectional view of the molded fiber spoon taken along line 6-6 as shown in FIG. 4.
Figure 7:
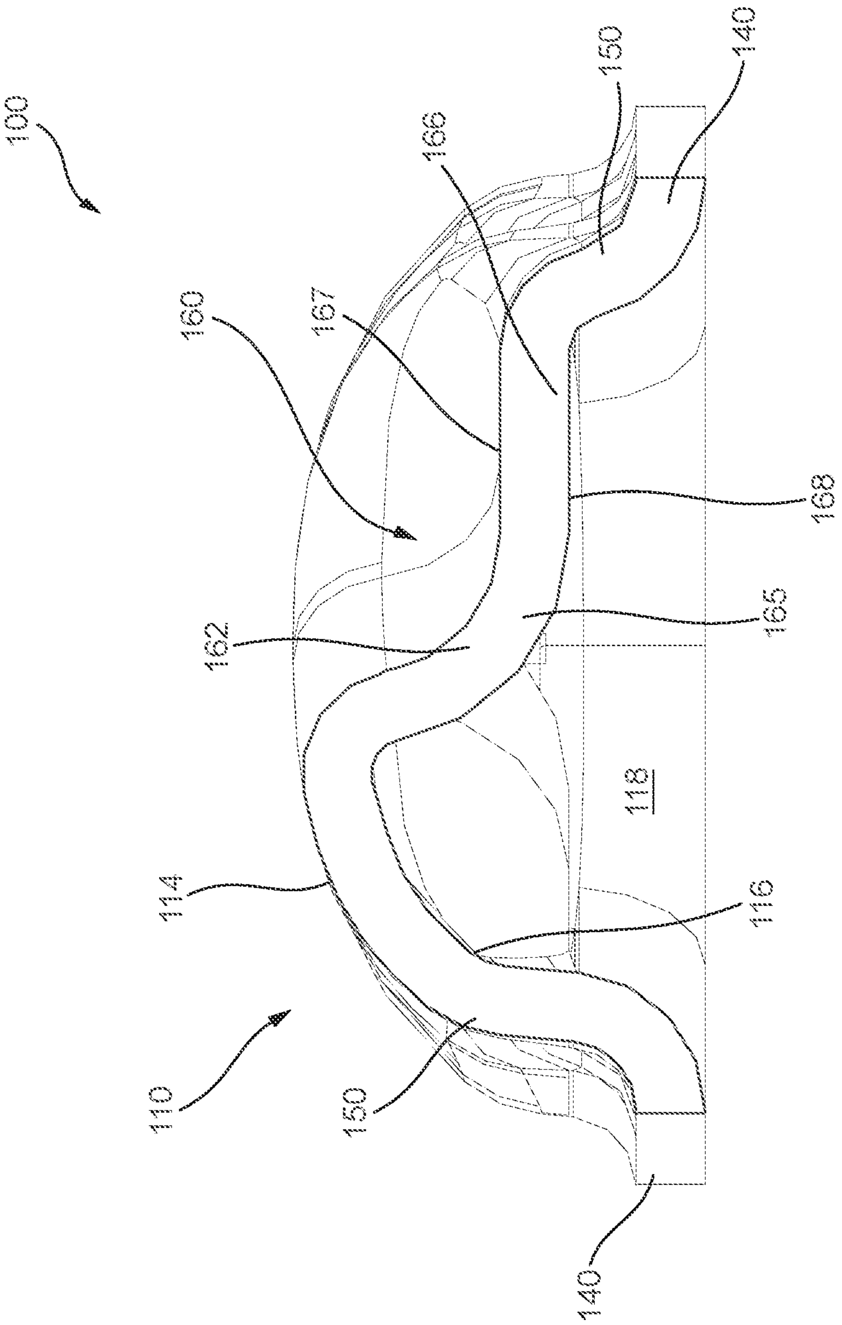
FIG. 7 shows a transverse cross-sectional view of the molded fiber spoon taken along line 7-7 as shown in FIG. 4.

As best seen in FIGS. 1 and 3, handle 110 may include a convex-shaped top wall 114 extending across a length of handle 110. The convex top wall 114 may extend from an end 111 of handle 110 to a transition section 112 of spoon 100, where handle 110 merges with neck 120. As shown in FIGS. 2 and 5, handle 110 may include a concave-shaped bottom wall 116 extending across the length of handle 110. Bottom wall 116 may extend from end 111 of handle 110 to transition section 112 of spoon 100, where handle 110 merges with neck 120. With reference to FIGS. 6 and 7, bottom wall 116 may be disposed directly beneath top wall 114. Top wall 114 and bottom wall 116 of handle 110 may collectively bulge in an upward direction and define a hollow cavity 118. Hollow cavity 118 may be bounded by bottom wall 116 and extend along the length of handle 110.

Spoon 100 may include a flange 140 disposed along a perimeter of handle 110 and disposed below top wall 114 that may extend in a lateral direction along a right side 102 and a left side 104 of handle 110. Spoon 100 may include an outer sidewall 150 extending in a vertical direction from a lower end 115 of convex top wall 114 to flange 140. Along right side 102 and left side 104 of handle 110, outer sidewall 150 may have a uniform height defined between flange 140 and lower end 115 of convex top wall 114.

Handle 110 may include one or more geometric aspects that reinforce handle 110 against torsional forces and loads applied against spoon 100 while being used to scoop and/or hold contents. For example, handle 110 may include a plurality of recesses 160 disposed on top wall 114. One or more of the plurality of recesses 160 may be disposed on right side 102 of handle 110, and one or more of the plurality of recesses 160 may be disposed on left side 104 of handle 110. The plurality of recesses 160 each may recede toward a first plane A defined by flange 140. The plurality of recesses 160 may also recede away from first plane A defined by flange 140.

The shape of each recesses 160 may be configured to promote the dissipation of forces applied orthogonally to spoon 100, thereby increasing the strength and stiffness of handle 110. For example, the plurality of recesses 160 may include a curved inner sidewall 162 extending downwardly from top wall 114 of handle 110. Curved inner sidewall 162 may include a first end 163 and a second end 164 disposed at outer sidewall 150. Curved inner sidewall 162 may bend inward towards a longitudinal axis Y of spoon 100. By bending toward longitudinal axis Y of spoon 100, inner sidewall 162 may dissipate applied forces in a direction tangential to a radius of curvature of inner sidewall 162. The radius of curvature defined by curved inner sidewall 162 may be increased or decreased to adjust the quantity of force dissipated by recesses 160.

The plurality of recesses 160 may include a bottom wall 166 extending in a lateral direction from a lower end 165 of curved inner sidewall 162 to outer sidewall 150. Bottom wall 166 may be disposed above flange 140. Bottom wall 166 of recesses 160 may include a flat upper surface 167 and a flat bottom surface 168 to promote gripping of handle 110 and to allow the handles of multiple spoons 100 to be nested on each other such that spoons 100 may be neatly stacked.

The number of recesses 160 may be increased or decreased to provide handle 110 with a particular degree of strength and stiffness suitable for inhibiting torsion and deflection. For example, at least two or more recesses 160 may be disposed on right side 102 of handle 110, and at least two or more recesses 160 may be disposed on left side 104 of handle 110 so that there is an adequate length of curved surfaces to dissipate applied forces along a significant portion (e.g., 60% to 95%) of handle 110. For example, the number of recesses 160 disposed on right side 102 of handle 110 may be equal to the number of recesses 160 disposed on left side 104 of handle 110. The number of recesses 160 disposed on right side 102 of handle 110 may be more or less than the number of recesses 160 disposed on left side 104 of handle 110.

The arrangement of recesses 160 may be shifted in an axial direction (e.g., axis Y shown in FIG. 4) along handle 110 so that recesses 160 are disposed at locations where stress is typically concentrated along handle 110. Locating recesses 160 at the stress points of handle 110 allows a greater quantity of force to be dispersed while spoon 100 is used. The plurality of recesses 160 disposed on right side 102 of handle 110 may be offset with respect to the plurality of recesses 160 disposed on left side 104 of handle 110 to dissipate applied forces evenly along a length of handle 110. The plurality of recesses 160 disposed on right side 102 of handle 110 may partially overlap the plurality of recesses 160 disposed on left side 104 of handle 110 while still being offset with each other.

Handle 110 may further include a rib 170 to reinforce handle 110 and inhibit torsion. Rib 170 may be formed in top wall 114 by curved inner sidewalls 162 of the plurality of recesses 160. Rib 170 may undulate along a length of handle 110 due to the shape of curved inner sidewalls 162. By undulating along a length of handle 110, rib 170 may disrupt applied forces in a direction tangential to curved edges 172, thereby increasing the stability and preventing twisting of handle 110.

Rib 170 may include a plurality of curved edges 172 corresponding to an upper edge of curved inner sidewalls 162 disposed on right side 102 of handle 110 and a plurality of curved edges 172 corresponding to an upper edge of curved inner sidewalls 162 disposed on left side 104 of handle 110. Curved edges 172 disposed on right side 102 of handle 110 may be offset with respect to curved edges 172 disposed on left side 104 of handle 110 such that rib 170 has a sinusoidal or a rounded wave shape extending along the length of handle 110.

Rib 170 may undulate along a significant portion of handle 110 (e.g., in a range from 60% to 100% of the length of handle 110). The length of rib 170 may be adjusted by increasing or decreasing the number of recesses 160 arranged on right side 102 and left side 104 of handle 110. The geometry of rib 170 (e.g., degree of bending and the width of rib 170) may be adjusted by increasing or decreasing the radius of curvature of curved inner sidewalls 162. The degree of strength added to handle 110 may be adjusted by altering the shape (e.g., radius of curvature) and the dimensions (e.g., width, length, and height) of rib 170.

Figure 4:
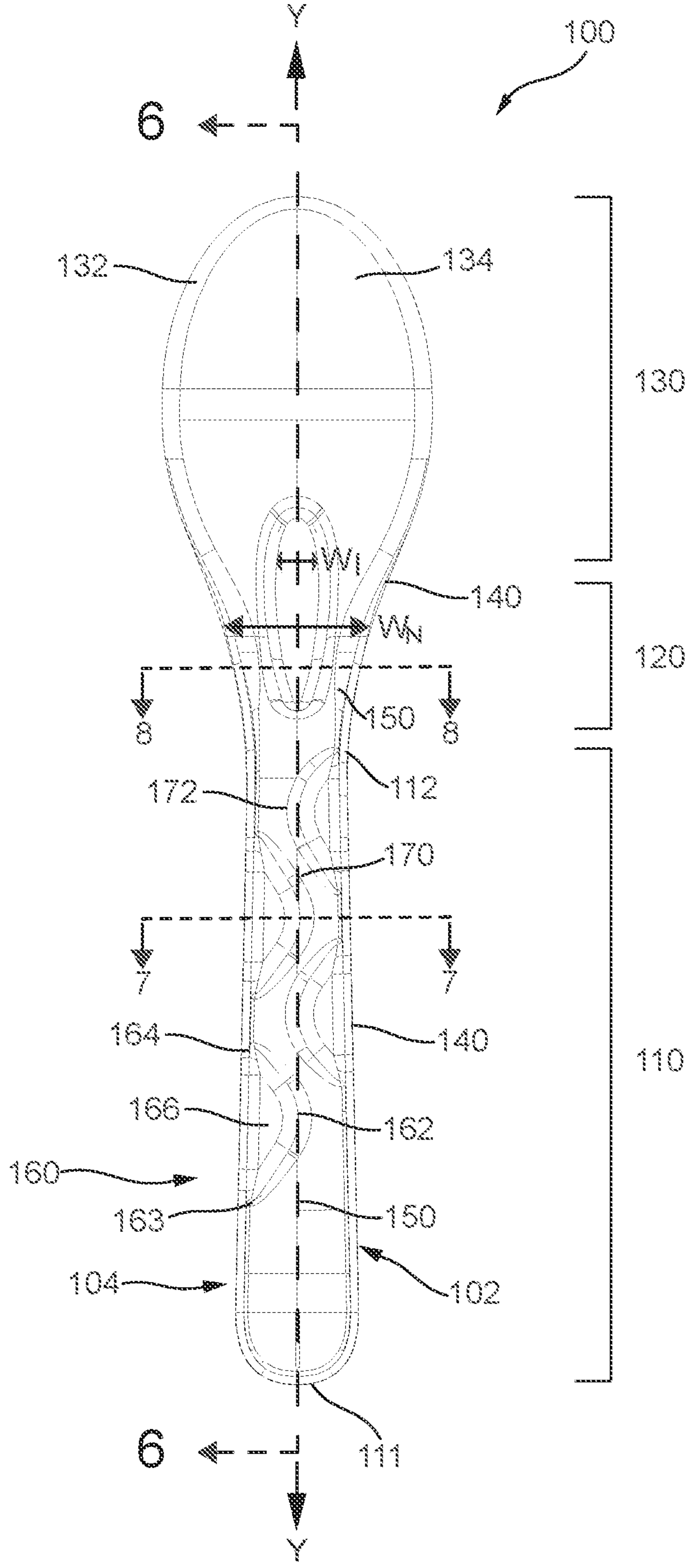
FIG. 4 shows a top view thereof.

Neck 120 extends from transition section 112 of spoon 100 to a rim 132 of bowl 130. At the transition section 112, neck 120 begins to curve outward in a lateral direction from elongated handle 110 to provide a curved transition from elongated handle 110 to rounded bowl 130. As best seen in FIG. 4, a width $W_N$ of neck 120 increases as neck 120 extends from transition section 112 to rim 132 of bowl 130.

Neck 120 may include a convex-shaped top wall 124 extending across a length of neck 120. At the transition section 112 of spoon 100, top wall 124 of neck 120 may extend continuously from top wall 114 of handle 110. Neck 120 may include a concave-shaped bottom wall 126 disposed directly underneath top wall 124 and extending along the length of the neck 120. At the transition section 112 of spoon 100, bottom wall 126 of neck 120 may extend continuously from bottom wall 116 of handle 110. Top wall 124 and bottom wall 126 of neck 120 may collectively bulge in an upward direction and define a hollow cavity 128 bounded by bottom wall 126.

Flange 140 may continue to extend along right side 102 and left side 104 of neck 120 from transition section 112 of spoon 100 to bowl 130. Flange 140 may converge at rim 132 of bowl 130 and may be disposed below top wall 124 of neck 120. Along right side 102 and left side 104 of neck 120, flange 140 may curve outward in a lateral direction from handle 110. A first section 141 of flange 140 disposed along neck 120 may be inclined with respect to plane A defined by a second section 142 of flange 140 disposed along handle 110, thereby providing a transition from a bottom surface of handle 110 to rim 132 of bowl 130.

Outer sidewall 150 may continue to extend along right side 102 and left side 104 of neck 120 from transition section 112 of spoon 100 to bowl 130. Outer sidewall 150 may extend in a vertical direction from convex top wall 124 of neck 120 to flange 140. Along right side 102 and left side 104 of neck 120, outer sidewall 150 may curve outward in a lateral direction from handle 110. Along right side 102 and left side 104 of neck 120, outer sidewall 150 may have a height that tapers along the length of neck 120 such that outer sidewall 150 converges at rim 132 of bowl 130.

Bowl 130 may recede below handle 110. Rim 132 of bowl 130 may extend substantially level along a second plane B that is disposed below and extending substantially parallel to first plane A defined by second section 142 of flange 140. Bowl 130 may include a curved upper surface 134 and a curved bottom surface 136 extending downwardly from rim 132. Upper surface 134 of bowl 130 may define a bowl cavity 138 for scoping and holding.

Figure 8:
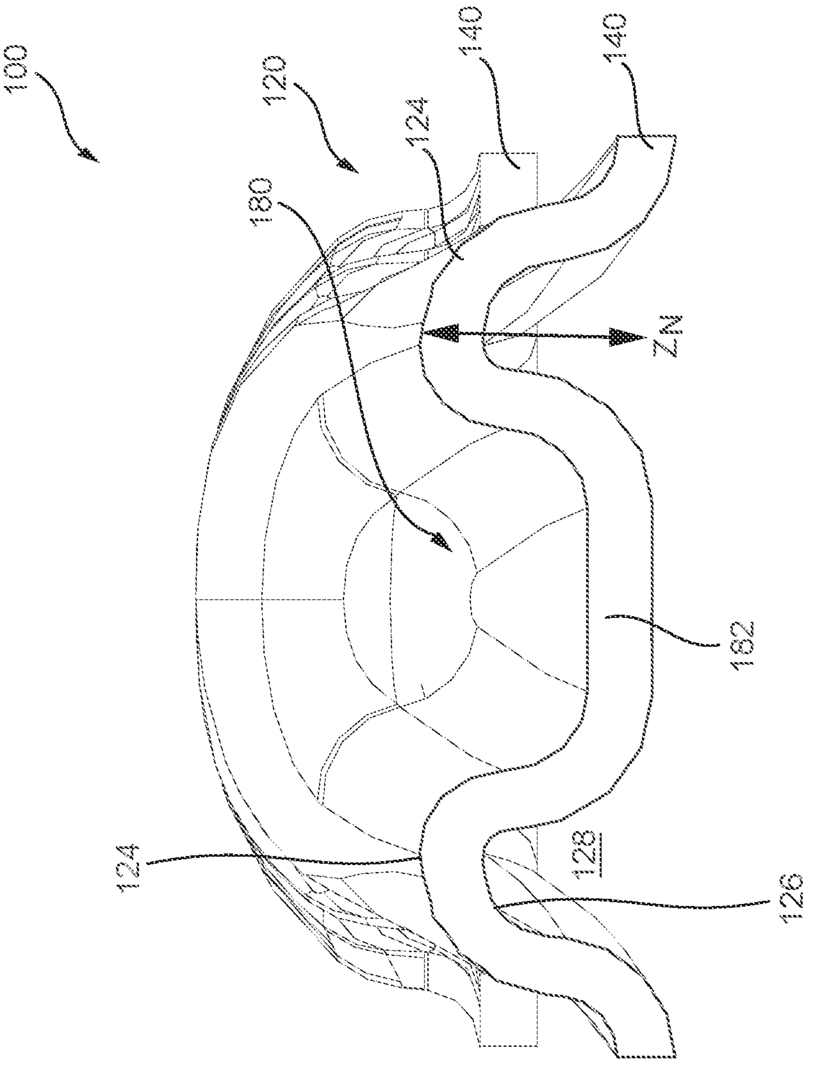
FIG. 8 shows a transverse cross-sectional view of the molded fiber spoon taken along line 8-8 as shown in FIG. 4.
Figure 9:
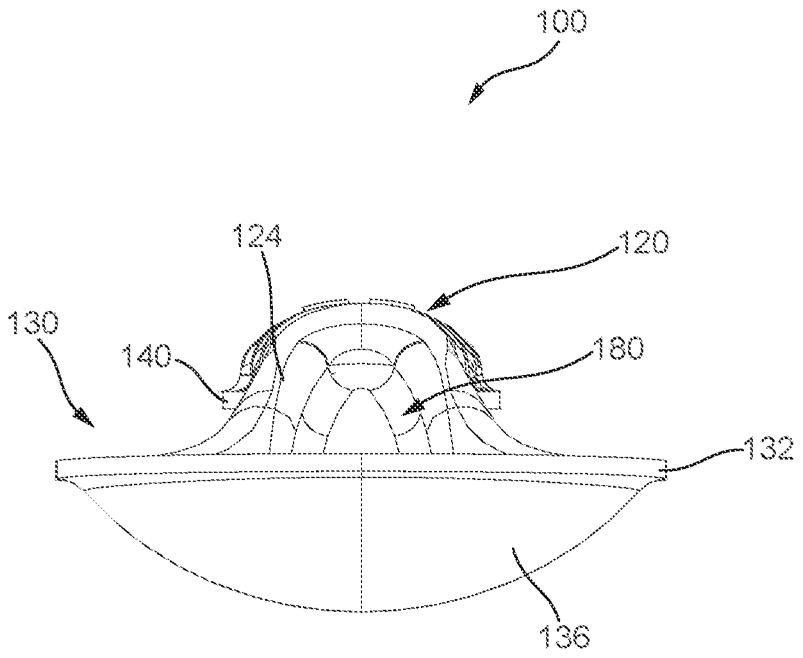
FIG. 9 shows a front view of the molded fiber spoon of FIG. 1.
Figure 10:
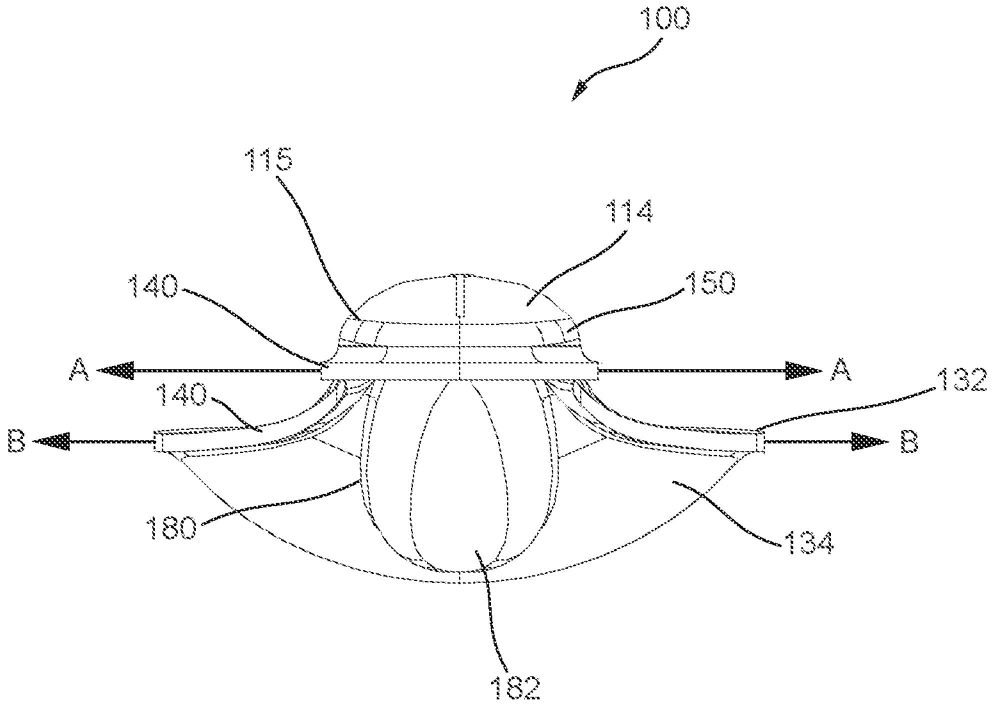
FIG. 10 shows a rear view of the molded fiber spoon of FIG. 1.

Spoon 100 may include an indentation 180 disposed along a portion of neck 120 and bowl 130 to add stability to spoon 100 when a load is applied to bowl 130, such as, for example, when using spoon 100 to scoop or hold contents. Indentation 180 may include a concave base 182 disposed below convex top wall 124 of neck 120. Concave base 182 may include a first end 184 bounded by convex top wall 124 of neck 120 and a second end 186 bounded by upper surface 134 of bowl 130. With reference to FIG. 8, a height ZN of convex top wall 124 of neck 120 tapers along sides of indentation 180 such that convex top wall 124 converges at upper surface 134 of bowl 130. The combination of tapering convex top wall 124 of neck 120 and concave base 182 of indentation 180 provides a smooth transition from convex top wall 114 of handle 110 to upper surface 134 of bowl 130, thereby adding stability to neck 120.

Concave base 182 may be shaped to have rounded edges to promote the dissipation of forces along neck 120. Concave base 182 may be oval-shaped. First end 184 of concave base 182 may be disposed adjacent to transition section 112 of spoon 100, and second end 186 of concave base 182 may be disposed along bowl 130. The length of concave base 182 extending into bowl 130 may be adjusted to vary the degree of stability added to bowl 130. For example, by extending at least along a predetermined percentage (e.g., in a range from 10% to 50%) of the length of bowl 130, concave base 182 of indentation 180 adds significant stability to bowl 130 and neck 120 to resist torsion. With reference to FIG. 4, a width Wi of concave base 182 may vary along the length of indentation 180. Width Wi of concave base 182 may be greater along a first section of concave base 182 that is disposed along bowl 130 than a second section of concave base 182 that is disposed along neck 120.

In use, the one or more geometric aspects (e.g., recesses 160, rib 170, and indentation 180) dissipate applied forces and inhibit torsion such that spoon 100 is able to scoop and retain content without bending at neck 120 or twisting at handle 110.

With reference to FIGS. 11-20, for example, molded fiber cutlery may include a fork 200. In some embodiments, fork 200 may include an elongated handle shown generally at 210, a neck shown generally at 220 extending from handle 210, a plurality of tines shown generally at 230 extending from neck 220. Handle 210, neck 220, and the plurality of tines 230 may be unitary such that handle 210, neck 220, and the plurality of tines 230 are integrally made from the same material, such as, for example, molded fiber material.

Handle 210 of fork 200 may include the same and/or similar features of handle 110 of spoon 100. For example, handle 210 may include a convex-shaped top wall 214 and a concave-shaped bottom wall 216. Top wall 214 may extend from an end 211 of handle 210 to a transition section 212 of fork 200, where handle 210 merges with neck 220. Bottom wall 216 may extend from end 211 of handle 210 to transition section 212 of fork 200. Top wall 214 and bottom wall 216 may collectively bulge in an upward direction and define a cavity 218 bounded by bottom wall 216.

Fork 200 may include a flange 240 having the same or similar features of flange 140 of spoon 100. For example, flange 240 may be disposed along a perimeter of handle 210 and disposed below top wall 214. Flange 240 may extend in a lateral direction along a right side 202 and a left side 204 of handle 210.

Fork 200 may include an outer sidewall 250 having the same or similar features of outer sidewall 150 of spoon 100. For example, outer sidewall 250 may extend in a vertical direction from a lower end 215 of convex top wall 214 to flange 240. Along right side 202 and left side 204 of handle 210, outer sidewall 250 may have a uniform height defined between flange 240 and lower end 215 of convex top wall 214.

Handle 210 may include one or more geometric aspects same or similar to handle 110 of spoon 100 that reinforce handle 210 against torsional forces and loads applied against fork 200 while being used to scoop and/or carry content. For example, handle 210 may include a plurality of recesses 260 disposed on top wall 214. One or more of the plurality of recesses 260 may be disposed on right side 202 of handle 210, and one or more of the plurality of recesses 260 may be disposed on left side 204 of handle 210. The plurality of recesses 260 each may recede toward a first plane C defined by flange 240 disposed along handle 210. The plurality of recesses 260 may also recede away from first plane C defined by flange 240 disposed along handle 210.

The shape of each recesses 260 may be the same or similar to the recesses 160 of spoon 100 to promote the dissipation of forces applied to fork 200. The plurality of recesses 260 may include a curved inner sidewall 262 extending downwardly from top wall 214 of handle 210. Curved inner sidewall 262 may include a first end 263 and a second end 264 disposed at outer sidewall 250. Curved inner sidewall 262 may bend inward towards a longitudinal axis Y of fork 200. By bending toward longitudinal axis Y of fork 200, inner sidewall 262 may dissipate applied forces in a direction tangential to a radius of curvature of inner sidewall 262. The radius of curvature defined by curved inner sidewall 262 may be increased or decreased to adjust the quantity of force dissipated by recesses 260.

The plurality of recesses 260 may include a bottom wall 266 extending in a lateral direction from a lower end 265 of curved inner sidewall 262 to outer sidewall 250. Bottom wall 266 may be disposed above flange 240. Bottom wall 266 of recesses 260 may include a flat upper surface 267 and a flat bottom surface 268 to promote gripping of handle 210 and to allow the handles of multiple forks 200 to be nested on each other such that forks 200 may be neatly stacked.

The number and arrangement of recesses 260 of fork 200 may be the same as or similar to the number and arrangement of recesses 160 of spoon 100. For example, at least two or more recesses 260 may be disposed on right side 202 of handle 210, and at least two or more recesses 260 may be disposed on left side 204 of handle 210 so that there is an adequate length of curved surfaces to dissipate applied forces along a significant portion (e.g., 60% to 95%) of handle 210. The number of recesses 260 disposed on right side 202 of handle 210 may be equal to the number of recesses 260 disposed on left side 204 of handle 210. The number of recesses 260 disposed on right side 202 of handle 210 may be more or less than the number of recesses 260 disposed on left side 204 of handle 210. The arrangement of recesses 260 may be shifted in an axial direction (e.g., axis Y shown in FIG. 14) along handle 210 so that recesses 260 are disposed at locations where stress is typically concentrated along handle 210. For example, the plurality of recesses 260 disposed on right side 202 of handle 210 may be offset with respect to the plurality of recesses 260 disposed on left side 204 of handle 210.

Fork 200 may include a rib 270 having the same or similar features of rib 170 of spoon 100 to reinforce handle 210 and inhibit torsion. For example, rib 270 may be formed in top wall 214 by curved inner sidewalls 262 of the plurality of recesses 260. Rib 270 may undulate along a length of handle 210 due to the shape of curved inner sidewalls 262. Rib 270 may include a plurality of curved edges 272 corresponding to an upper edge of curved inner sidewalls 262 disposed on right side 202 of handle 210 and a plurality of curved edges 272 corresponding to an upper edge of curved inner sidewalls 262 disposed on left side 204 of handle 210. Curved edges 272 disposed on right side 202 of handle 210 may be offset with respect to curved edges 272 disposed on left side 204 of handle 210 such that rib 270 has a sinusoidal or a rounded wave shape extending along the length of handle 210.

Figure 11:
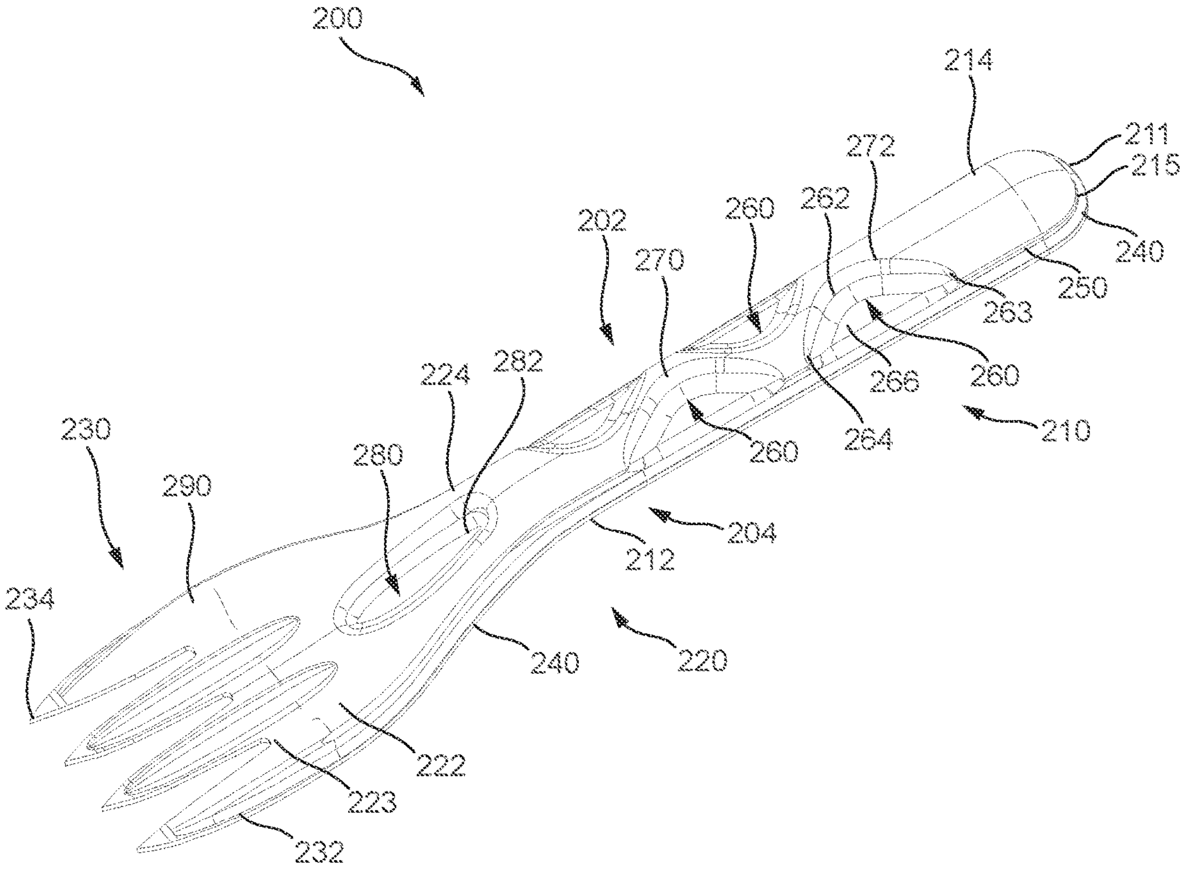
FIG. 11 shows a top perspective top view of a molded fiber fork according to another embodiment.
Figure 12:
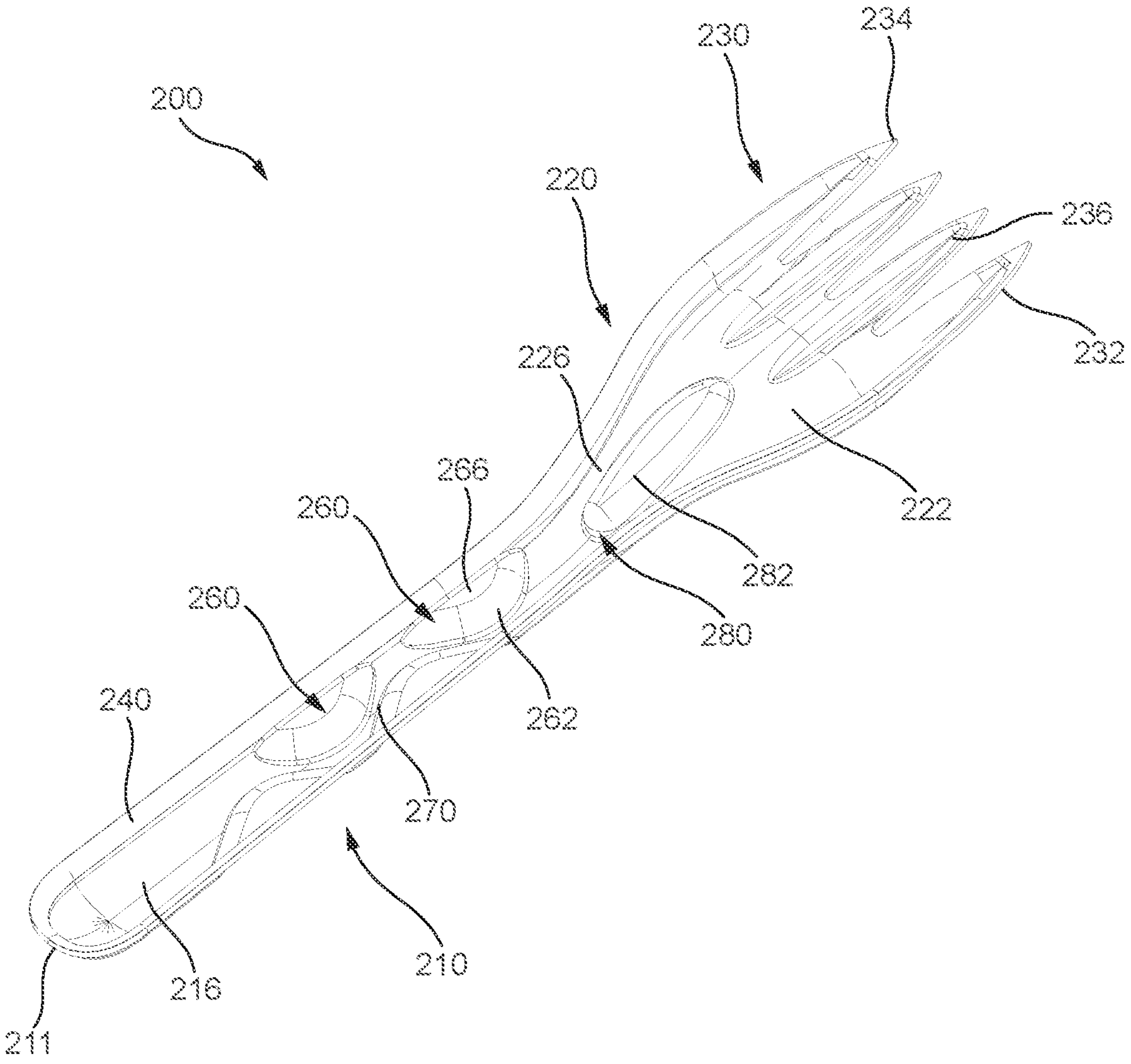
FIG. 12 shows a bottom perspective bottom view thereof.
Figure 13:
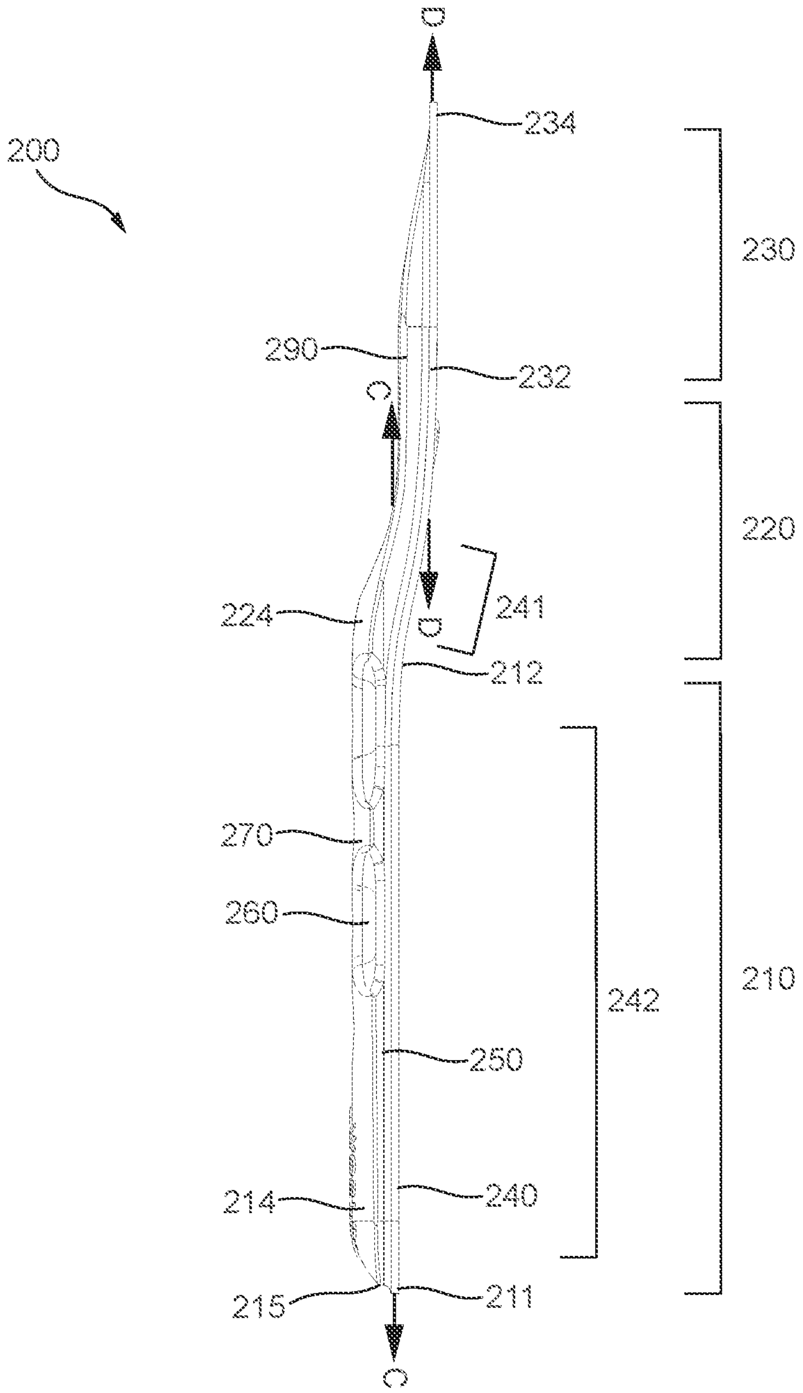
FIG. 13 shows a side view thereof.
Figure 14:
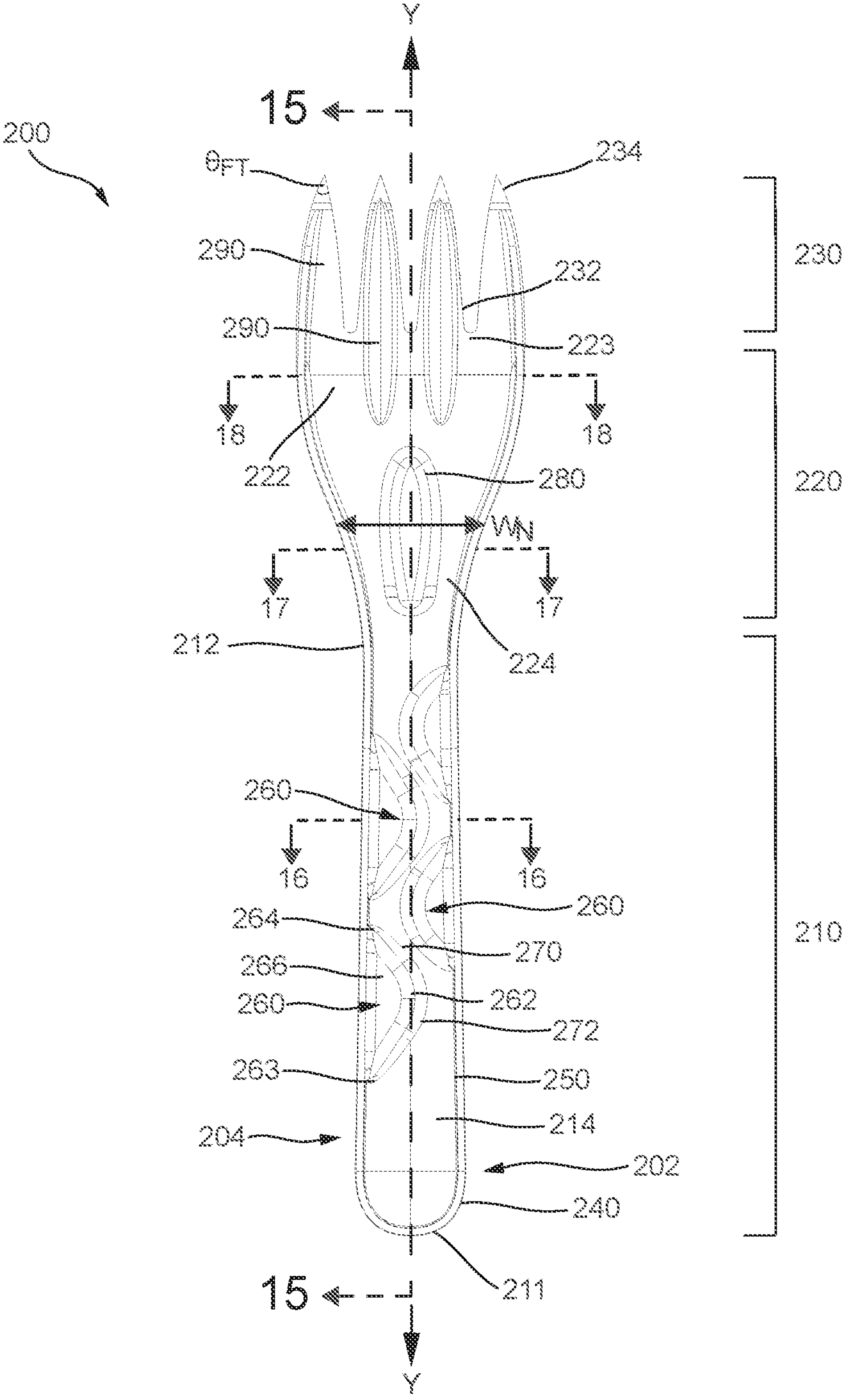
FIG. 14 shows a top view thereof.
Figure 15:
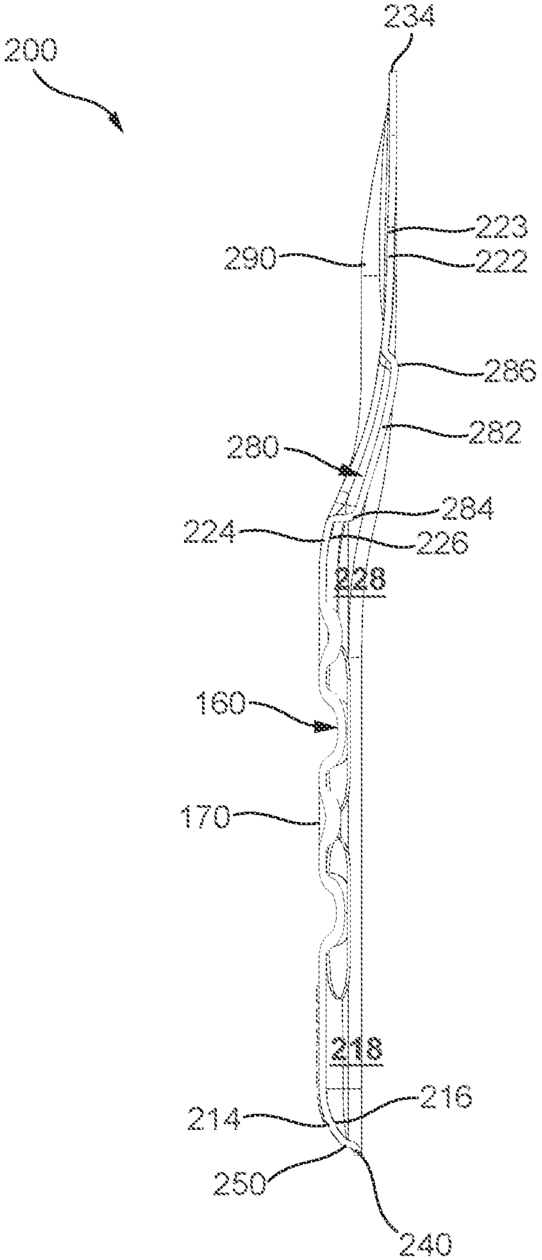
FIG. 15 shows a longitudinal cross-sectional view of the molded fiber fork of FIG. 11 taken along line 1515 of FIG. 14.
Figure 16:
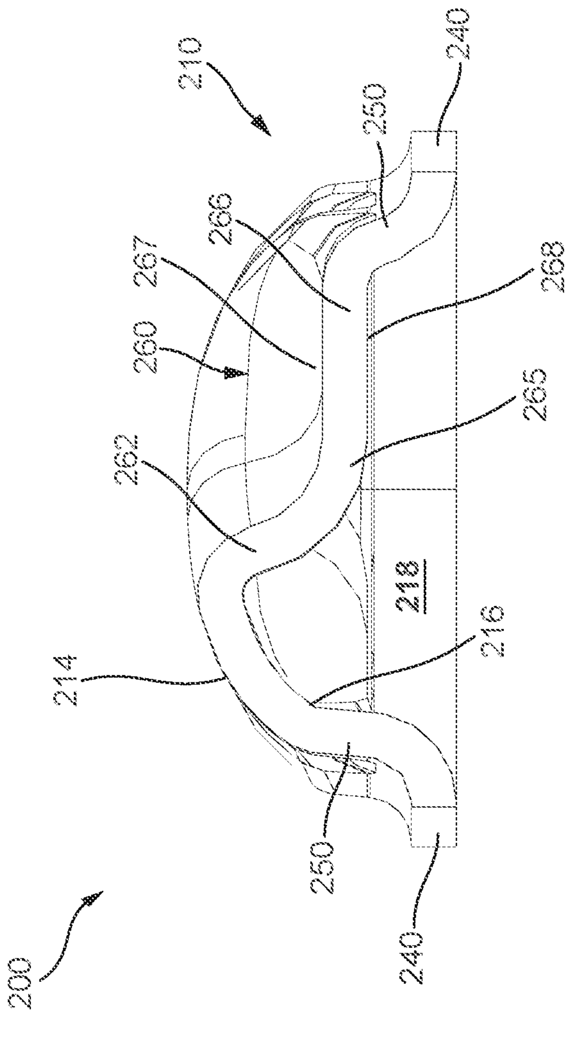
FIG. 16 shows a transverse cross-sectional view of the molded fiber fork of FIG. 11 taken along line 16-16 of FIG. 14.

Neck 220 of fork 200 may include the same and/or similar features of neck 120 of spoon 100. For example, neck 220 may extend from transition section 212 of fork 200 to the plurality of tines 230. At the transition section 212, neck 220 begins to curve outward in a lateral direction from elongated handle 210 to provide a curved transition from elongated handle 210 to tines 230 disposed on right side 202 and left side 204 of fork 200. As best seen in FIG. 14, a width $W_N$ of neck 220 increases as neck 220 extends from transition section 212 to tines 230 disposed on right side 202 and left side 204 of fork 200. Neck 220 may include a convex-shaped top wall 224 and a concave-shaped bottom wall 226. At the transition section 212 of fork 200, top wall 224 of neck 220 may extend continuously from top wall 214 of handle 210, and bottom wall 226 of neck 220 may extend continuously from bottom wall 216 of handle 210. Top wall 224 and bottom wall 226 may collectively bulge in an upward direction and define a cavity 228 bounded by bottom wall 226. As best seen in FIG. 11, neck 220 may further include a concave base 222 extending from the convex top wall 224. Concave base 222 may include an end 223 located along a second plane D defined by a flange 232 of tines 230.

Flange 240 may continue to extend along right side 202 and left side 204 of neck 220 from transition section 212 of fork 200 to tines 230 disposed on right side 202 and left side 204 of fork 200. Flange 240 may merge with flange 232 of tines 230 at about end 223 of concave base 222. Flange 240 may be disposed below top wall 224 of neck 220. Along right side 202 and left side 204 of neck 220, flange 240 may curve outward in a lateral direction from handle 210. A first section 241 of flange 240 disposed along neck 220 may be inclined with respect to first plane C defined by a second section 242 of flange 240 disposed along handle 210, thereby providing a transition from a bottom surface of handle 210 to flange 232 of tines 230.

Outer sidewall 250 may continue to extend along right side 202 and left side 204 of neck 220 from transition section 212 of fork 200 to the plurality of tines 230. Outer sidewall 250 may extend in a vertical direction from convex top wall 224 of neck 220 to flange 240. Along right side 202 and left side 204 of neck 220, outer sidewall 250 may curve outward in a lateral direction from handle 210.

Figure 17:
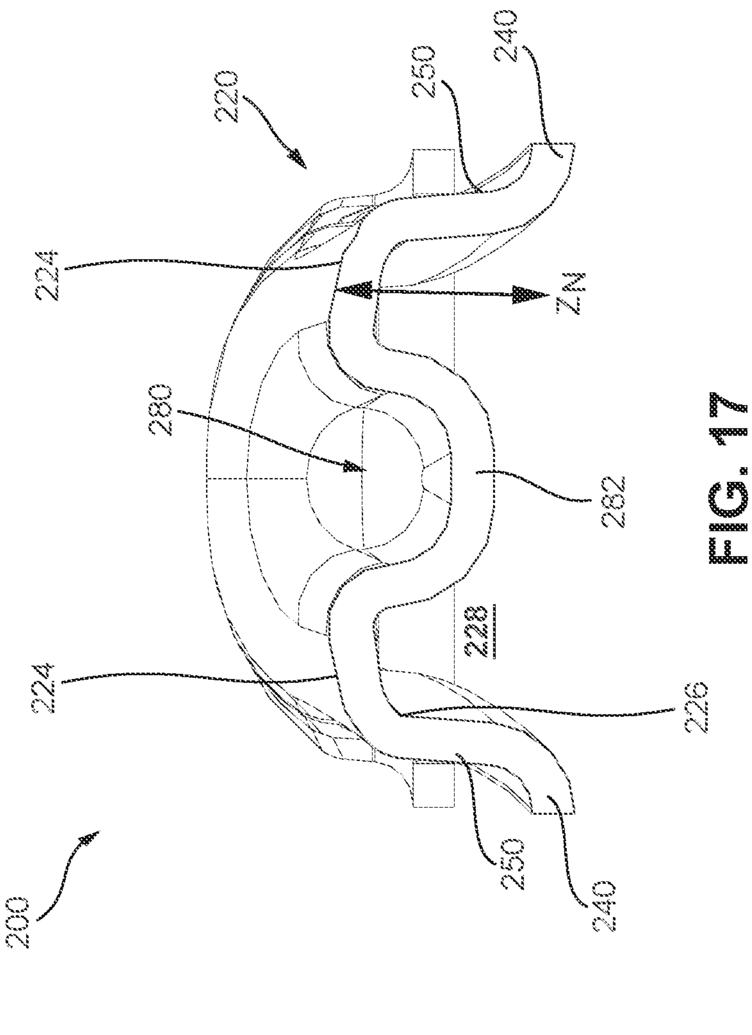
FIG. 17 shows a transverse cross-sectional view of the molded fiber fork of FIG. 11 taken along line 17-17 of FIG. 14.

Fork 200 can include an indentation 280 disposed along a portion of neck 220 to add stability to fork 200 when a load is applied on the plurality of tines 230, such as, for example, when using fork 200 to scoop or hold contents. Indentation 280 may have the same or similar features of indentation 180 of spoon 100. For example, indentation 280 may include a concave base 282 disposed below convex top wall 224 of neck 220. Concave base 282 may include a first end 284 bounded by convex top wall 224 of neck 220 and a second end 286 bounded by concave base 222 of neck 220. With reference to FIG. 17, a height ZN of convex top wall 224 of neck 220 tapers along sides of indentation 280 such that convex top wall 224 converges at concave base 222 of neck 220. The combination of tapering convex top wall 224 of neck 220 and concave base 282 of indentation 280 provide a smooth transition from convex top wall 214 of handle 210 to concave base 222 of neck 220, thereby adding stability to neck 220. Concave base 282 may be shaped to have rounded edges (e.g., oval-shaped) to promote the dissipation of forces along neck 220.

The plurality of tines 230 may each include a flat tip 234. The flange 232 of tines 230 may extend from end 223 of concave base 222 to tip 234. Flange 232 and tip 234 may extend substantially along second plane D that is disposed below first plane C defined by second section 242 of flange 240 extending along handle 210. The plurality of tines 230 may each include a concave bottom surface 236 bulging in a vertical direction from flange 232 and tip 234. The flat shape of flange 232 and tip 234 minimize the height of tines 230 at the edges so that tines 230 may effectively pierce or scoop content. The concave shape of bottom surface 236 adds rigidity to tines 230 so that tines 230 inhibit twisting or bending when used to pierce or scoop content. The number of tines 230 extending from neck 220 may range from 2 tines to 5 tines, such as, for example, 4 tines.

The shape of tip 234 may be configured to provide tine 230 with a sufficient degree of strength for holding a food item without bending, while being sharp enough for effectively piercing the food item. For example, as shown in FIG. 14, each tine 230 may converge at tip 234 by an angle $\Theta_{FT}$ ranging from approximately 34 degrees to approximately 40 degrees, such as, for example, from approximately 36 degrees to approximately 38 degrees. Increasing the angle $\Theta_{FT}$ of tip 234 beyond this range may make tip 234 too blunt to effectively pierce a food item. Decreasing the angle $\Theta_{FT}$ of tip 234 below this range may not provide tine 230 enough strength to effectively inhibit buckling when holding a food item.

Figure 18:
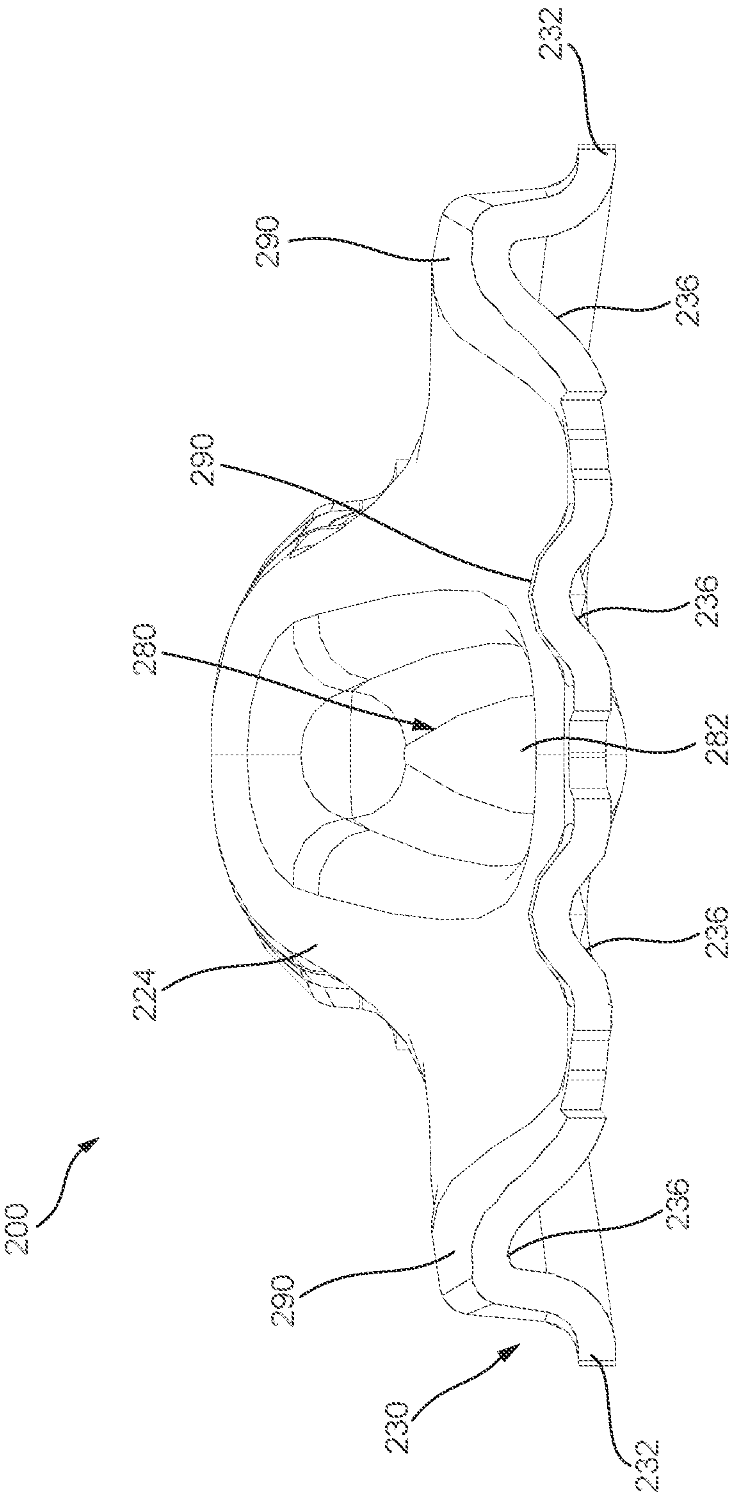
FIG. 18 shows a transverse cross-sectional view of the molded fiber fork of FIG. 11 taken along line 18-18 of FIG. 14.
Figure 19:
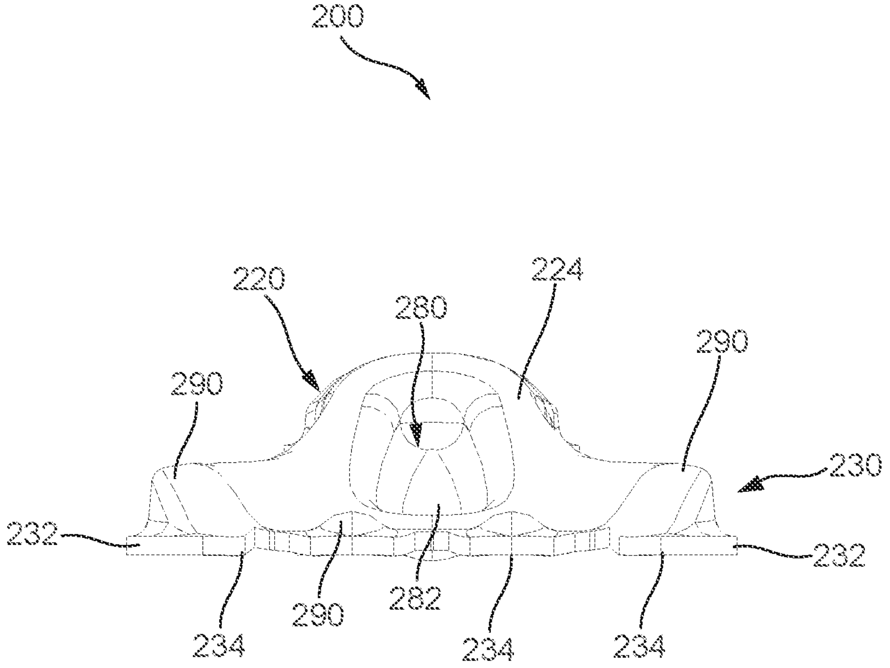
FIG. 19 shows a front view of the molded fiber fork of FIG. 11.
Figure 20:
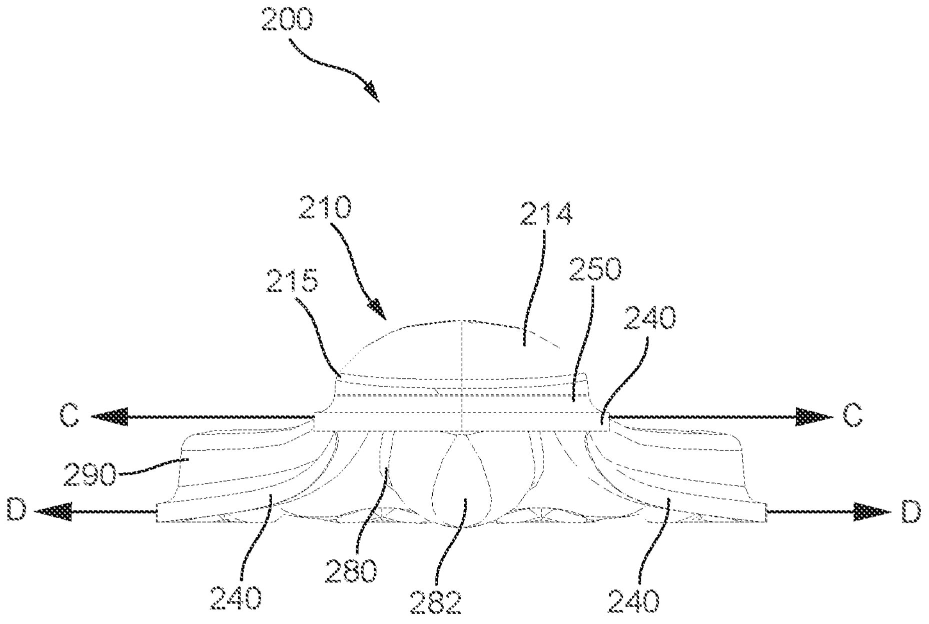
FIG. 20 shows a rear view thereof.

Fork 200 may include a plurality of hollow ridges 290 disposed along a portion of neck 220 and the plurality tines 230 to add strength and rigidity to fork 200, ultimately preventing neck 220 and the plurality of tines 230 from twisting when used to scoop and/or carry content. The plurality of ridges 290 may each extend along concave base 222 and one of the tines 230. The plurality of ridges 290 may each have a height that tapers along tine 230 such that each ridge 290 terminates proximately to flat tip 234 of a respective tine 230. With reference to FIG. 18, ridge 290 and bottom surface 236 of tine 230 may collectively bulge away from flange 232 and tip 234 of tine 230, thereby defining a hollow cavity 292 bounded by bottom surface 236 of tine 230.

In use, the one or more geometric aspects (e.g., recesses 260, rib 270, indentation 280, and ridges 290) dissipate applied forces and inhibit torsion such that fork 200 is able to pierce and hold content without bending at neck 220 and tines 230 or twisting at handle 210.

With reference to FIGS. 21-30, for example, molded fiber cutlery may include a knife shown generally at 300. Knife 300 may include an elongated handle shown generally at 310, a neck shown generally at 320 extending from handle 310, and a blade shown generally at 330 extending from neck 320. Handle 310, neck 320, and blade 330 may be unitary such that handle 310, neck 320, and blade 330 are integrally made from the same material, such as, for example, molded fiber material.

Handle 310 of knife 300 may include the same or similar features of handle 110 of spoon 100 and/or handle 210 of fork 200. For example, handle 310 may include a convex-shaped top wall 314 and a concave-shaped bottom wall 316. Top wall 314 may extend from an end 311 of handle 310 to a first transition section 312 of knife 300, where handle 310 merges with neck 320. Bottom wall 316 may extend from end 311 of handle 310 to first transition section 312 of knife 300. Top wall 314 and bottom wall 316 may collectively bulge in an upward direction and define a cavity 318 bounded by bottom wall 316.

Knife 300 may include a flange 340 having the same or similar features of flange 140 of spoon 100 and/or flange 240 of fork 200. For example, flange 340 may be disposed along a perimeter of handle 310 and disposed below top wall 314. Flange 340 may extend in a lateral direction along a right side 302 and a left side 304 of handle 310. Flange 340 may extend substantially level along a first plane E that is disposed below top wall 314 of handle 310.

Knife 300 may include an outer sidewall 350 having the same or similar features of outer sidewall 150 of spoon 100 and/or outer sidewall 250 of fork 200. For example, outer sidewall 350 may extend in a vertical direction from a lower end 315 of convex top wall 314 to flange 340. Along right side 302 and left side 304 of handle 310, outer sidewall 350 may have a uniform height defined between flange 340 and lower end 315 of convex top wall 314.

Handle 310 may include one or more geometric aspects same or similar to handle 110 of spoon 100 and/or handle 210 of fork 200 that reinforce handle 310 against torsional forces and loads applied against knife 300 while being used to slice content. For example, handle 310 may include a plurality of recesses 360 disposed on top wall 314. One or more of the plurality of recesses 360 may be disposed on right side 302 of handle 310, and one or more of the plurality of recesses 360 may be disposed on left side 304 of handle 310. The plurality of recesses 360 each may recede toward first plane E defined by flange 340. The plurality of recesses 360 may also recede away from first plane E defined by flange 340.

The shape of each recesses 360 may be the same or similar to the recesses 160 of spoon 100 and/or recesses 260 of fork 200 to promote the dissipation of forces applied to knife 300. The plurality of recesses 360 may include a curved inner sidewall 362 extending downwardly from top wall 314 of handle 310. Curved inner sidewall 362 may include a first end 363 and a second end 364 disposed at outer sidewall 350. Curved inner sidewall 362 may bend inward towards a longitudinal axis Y of knife 300. By bending toward longitudinal axis Y of knife 300, inner sidewall 362 may dissipate applied forces in a direction tangential to a radius of curvature of inner sidewall 362. The radius of curvature defined by curved inner sidewall 362 may be increased or decreased to adjust the quantity of force dissipated by recesses 360.

The plurality of recesses 360 may include a bottom wall 366 extending in a lateral direction from a lower end 365 of curved inner sidewall 362 to outer sidewall 350. Bottom wall 366 may be disposed above flange 340. Bottom wall 366 of recesses 360 may include a flat upper surface 367 and a flat bottom surface 368 to promote gripping of handle 310 and to allow the handles of multiple knives 300 to be nested on each other such that knives 300 may be neatly stacked.

The number and arrangement of recesses 360 of knife 300 may be the same as or similar to the number and arrangement of recesses 160 of spoon 100. For example, at least two or more recesses 360 may be disposed on right side 302 of handle 310, and at least two or more recesses 360 may be disposed on left side 304 of handle 310 so that there is an adequate length of curved surfaces to dissipate applied forces along a significant portion (e.g., 60% to 95%) of handle 310. The number of recesses 360 disposed on right side 302 of handle 310 may be equal to the number of recesses 360 disposed on left side 304 of handle 310. The number of recesses 360 disposed on right side 302 of handle 310 may be more or less than the number of recesses 360 disposed on left side 304 of handle 310. The arrangement of recesses 360 may be shifted in an axial direction (e.g., axis Y shown in FIG. 23) along handle 310 so that recesses 360 are disposed at locations where stress is typically concentrated along handle 310. For example, the plurality of recesses 360 disposed on right side 302 of handle 310 may be offset with respect to the plurality of recesses 360 disposed on left side 304 of handle 310.

Knife 300 may include a rib 370 having the same or similar features of rib 170 of spoon 100 and/or rib 270 of fork 200 to reinforce handle 310 and inhibit torsion. For example, rib 370 may be formed in top wall 314 by curved inner sidewalls 362 of the plurality of recesses 360. Rib 370 may undulate along a length of handle 310 due to the shape of curved inner sidewalls 362. Rib 370 may include a plurality of curved edges 372 corresponding to an upper edge of curved inner sidewalls 362 disposed on right side 302 of handle 310 and a plurality of curved edges 372 corresponding to an upper edge of curved inner sidewalls 362 disposed on left side 304 of handle 310. Curved edges 372 disposed on right side 302 of handle 310 may be offset with respect to curved edges 372 disposed on left side 304 of handle 310 such that rib 370 has a sinusoidal or a rounded wave shape extending along the length of handle 310.

Figure 21:
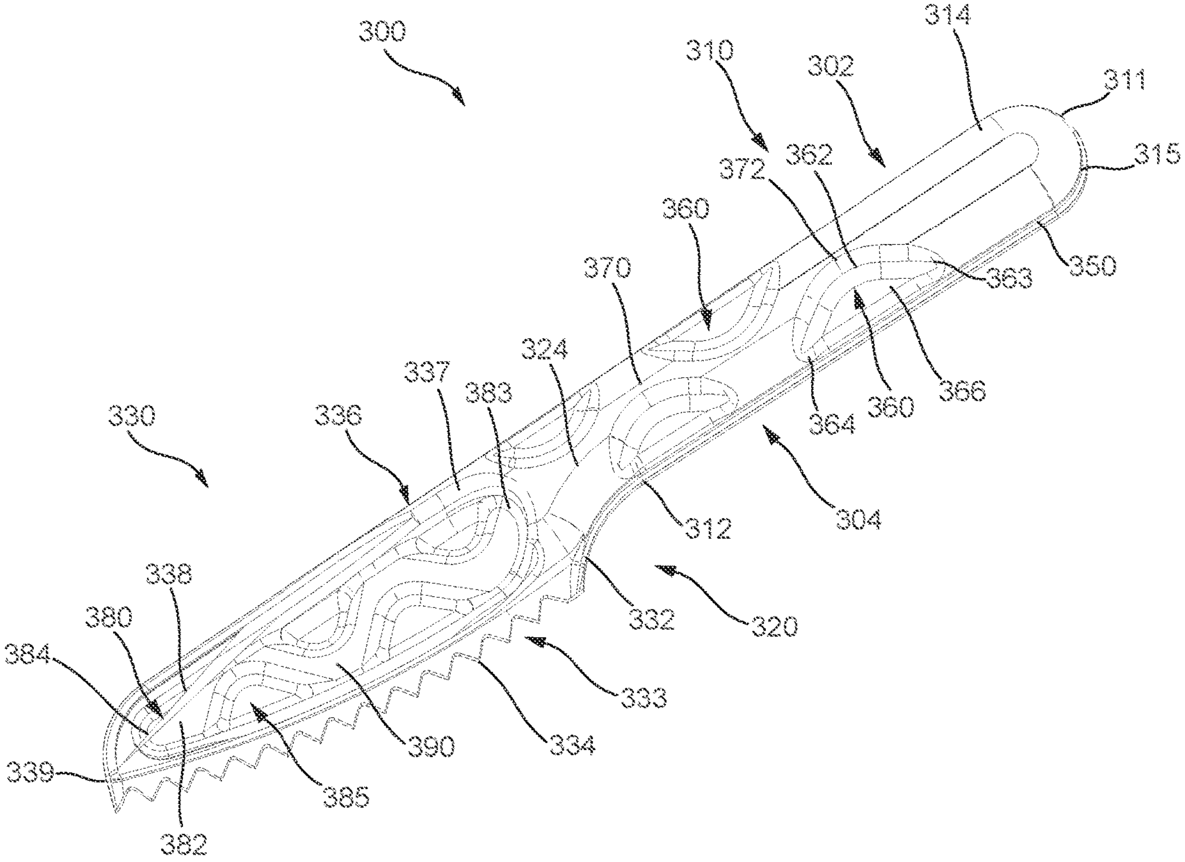
FIG. 21 shows a top perspective view of a molded fiber knife according to another embodiment.
Figure 22:
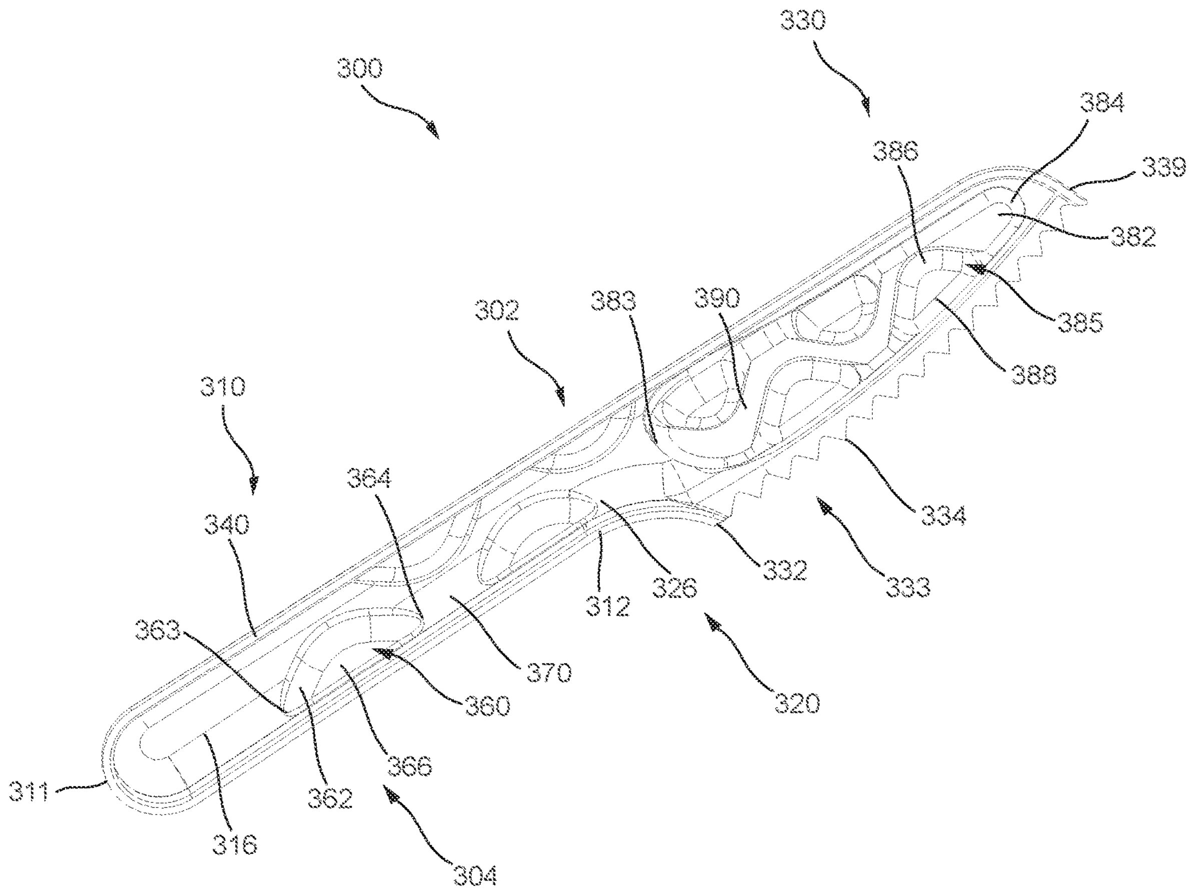
FIG. 22 shows a bottom perspective view thereof.
Figure 23:
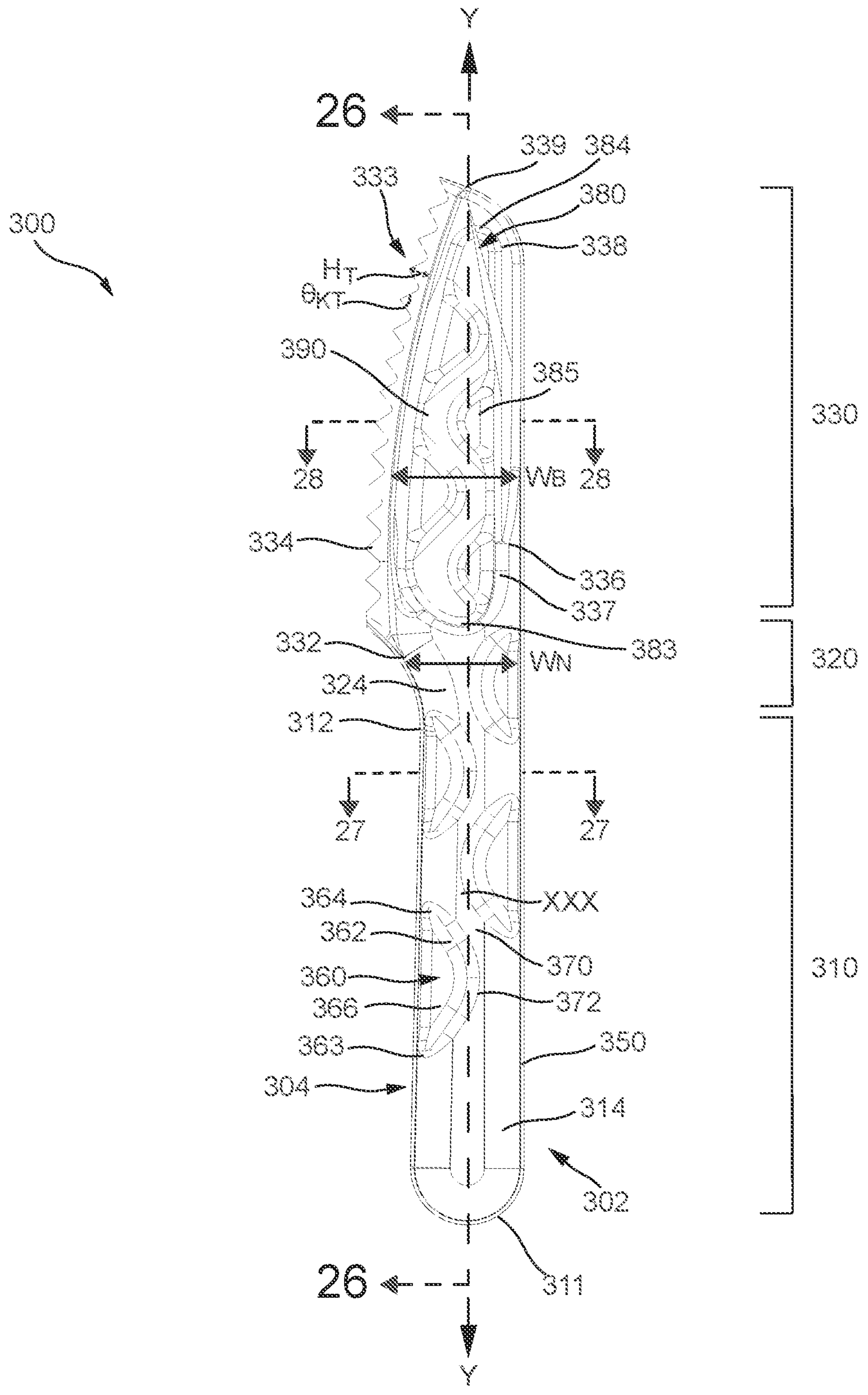
FIG. 23 shows a top view thereof.
Figure 24:
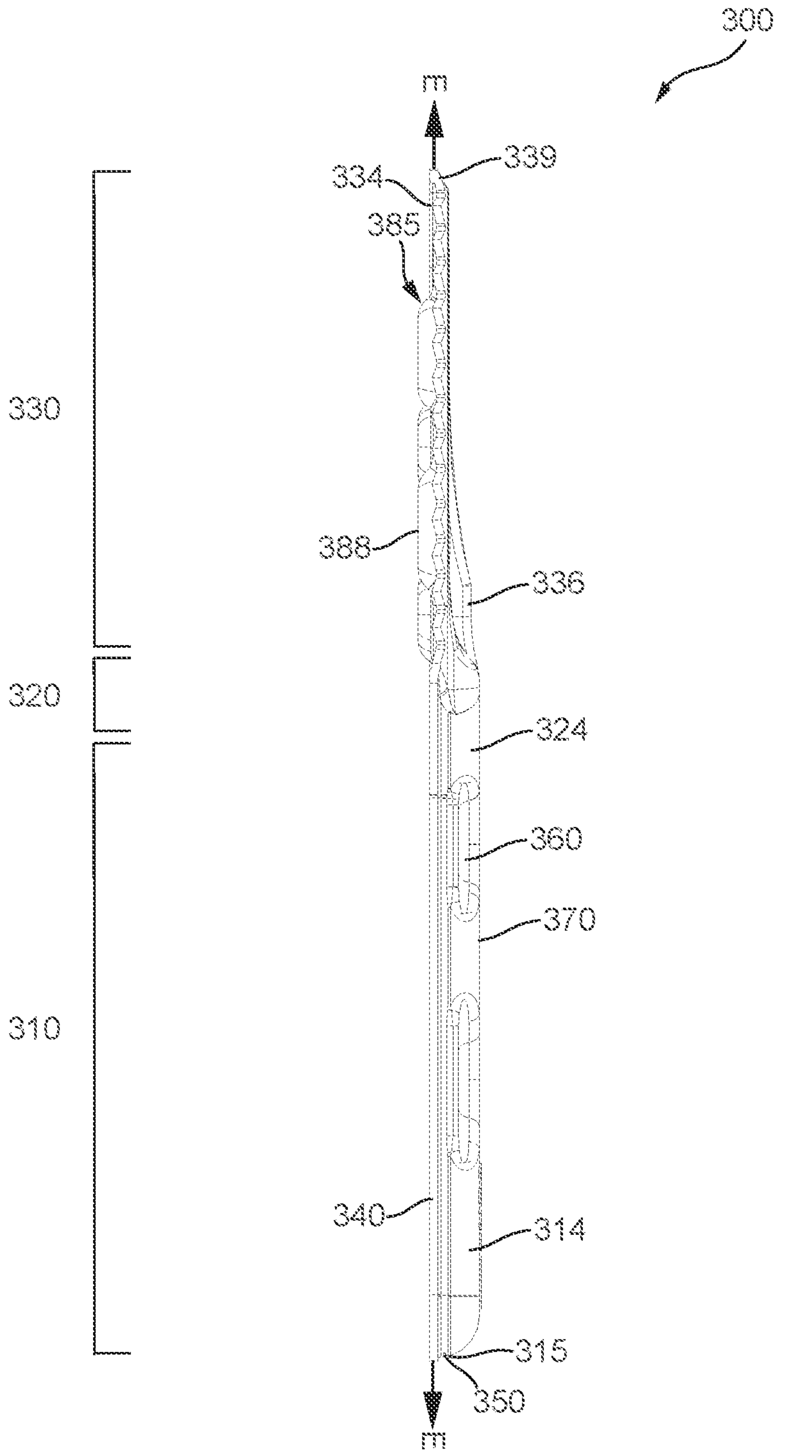
FIG. 24 shows a left side view thereof.
Figure 25:
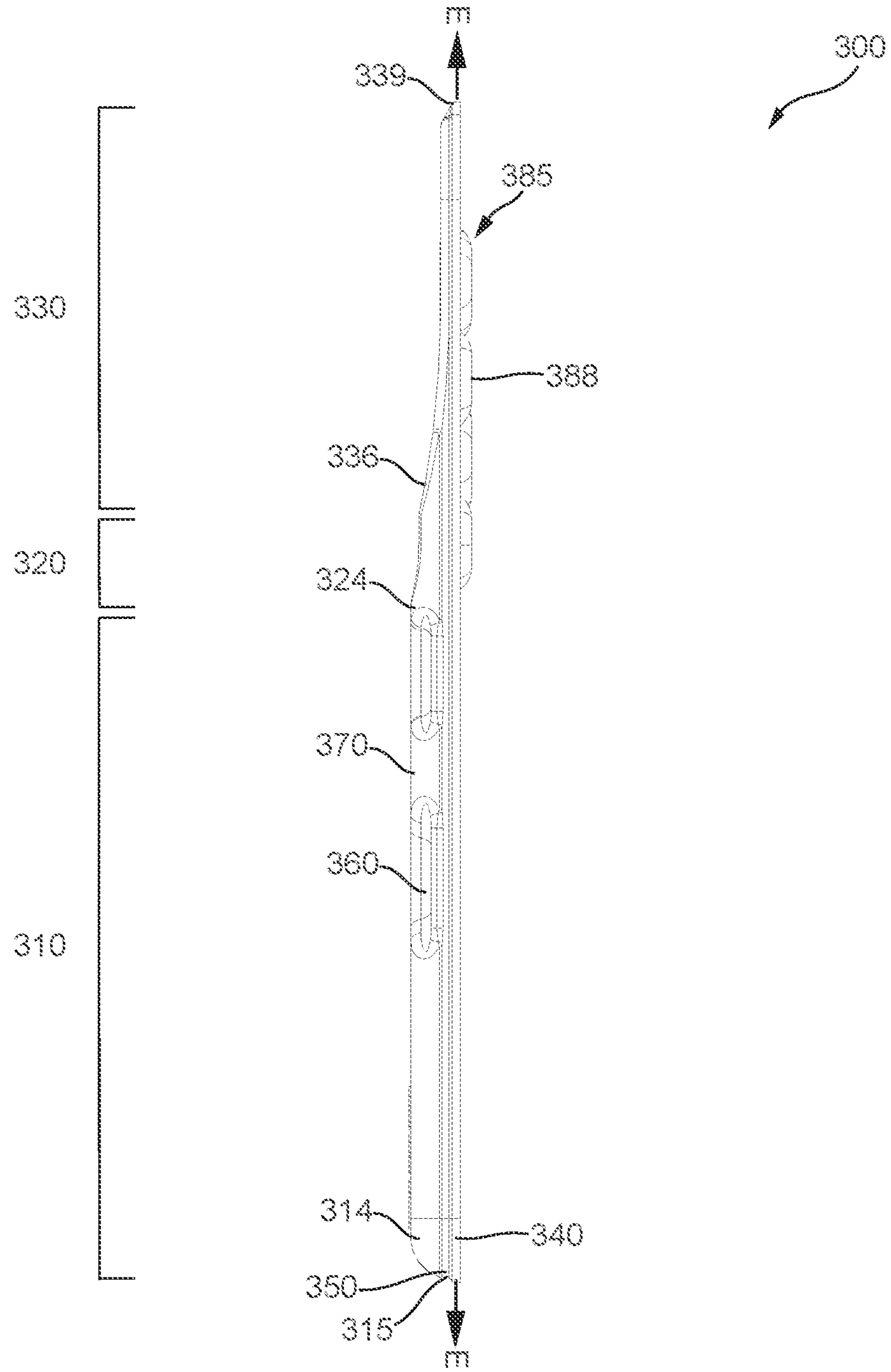
FIG. 25 shows a right side view thereof.
Figure 26:
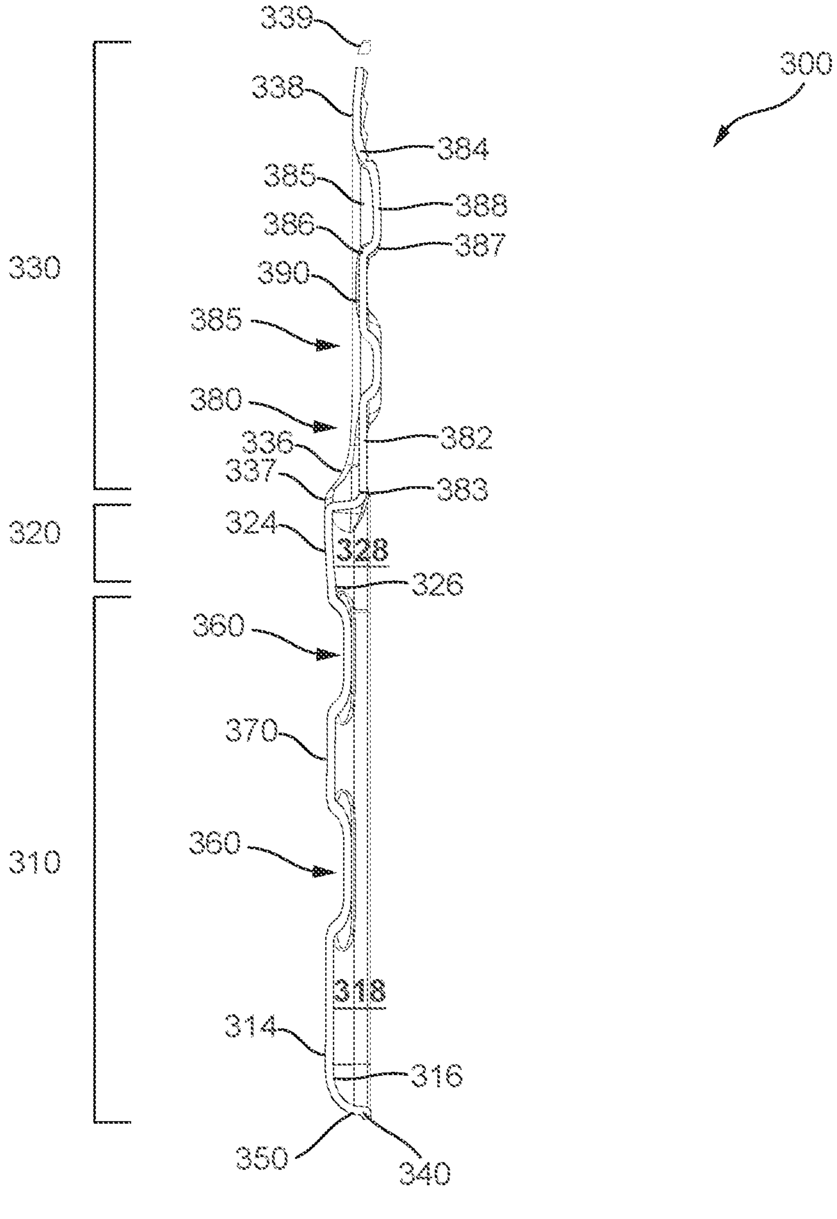
FIG. 26 shows a longitudinal cross-sectional view of the molded fiber knife of FIG. 21 taken along line 26-26 in FIG. 23.
Figure 27:
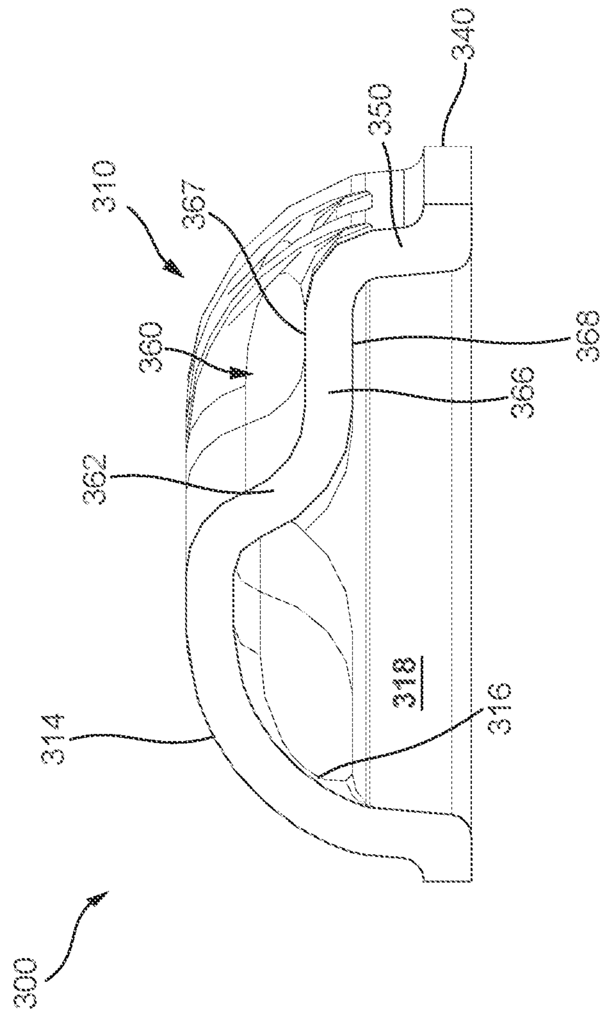
FIG. 27 shows a transverse cross-sectional view of the molded fiber knife of FIG. 21 taken along line 27-27 in FIG. 23.

Neck 320 of knife 300 may include the same and/or similar features of neck 120 of spoon 100 and/or neck 220 of fork 200. For example, neck 320 may extend from first transition section 312 of knife 300 to a second transition section 332, where neck 320 merges with blade 330. At first transition section 312, one side (e.g., left side 304) of neck 320 may begin to curve outward in a lateral direction from elongated handle 310 to provide a curved transition from elongated handle 310 to a side (e.g., left side 304) of blade 330. For example, as shown in FIG. 21, left side 304 of neck 320 may curve laterally outward from handle 310 to a serrated edge 333 of blade 330 used for cutting content. Right side 302 of neck 320 may be aligned with handle 310. As best seen in FIG. 23, a width $W_N$ of neck 320 increases as neck 320 extends from first transition section 312 to second transition section 332 of knife 300. Neck 320 may include a convex-shaped top wall 324 and a concave-shaped bottom wall 326. At first transition section 312 of knife 300, top wall 324 of neck 320 may extend continuously from top wall 314 of handle 310, and bottom wall 326 of neck 320 may extend continuously from bottom wall 316 of handle 310. Top wall 324 and bottom wall 326 may collectively bulge in an upward direction and define a cavity 328 bounded by bottom wall 326. One or more recesses 360 may be disposed along right side 302 of neck 320 to provide neck 320 a sufficient amount of rigidity to withstand torsion forces applied while using knife 300 to cut content.

Flange 340 may continue to extend along right side 302 and left side 304 of neck 320 from first transition section 312 of knife 300 to blade 330. Flange 340 may be disposed below top wall 324 of neck 320. Along left side 304 of neck 320, flange 340 may curve outward in a lateral direction from handle 310. Along right side 302 of neck 320, flange 340 may be aligned with the portion of the flange 340 disposed along right side 302 of handle 310. The portion of flange 340 disposed along neck 320 may extend substantially level along first plane E with the portion of flange 340 disposed along handle 310.

Outer sidewall 350 may continue to extend along right side 302 and left side 304 of neck 320 from first transition section 312 of knife 300 to blade 330. Outer sidewall 350 may extend in a vertical direction from top wall 324 of neck 320 to flange 340. Along left side 304 of neck 320, outer sidewall 350 may curve outward in a lateral direction from handle 310. Along right side 302 of neck 320, outer sidewall 350 may be aligned with the portion of the outer sidewall 350 disposed along right side 302 of handle 310.

Blade 330 may extend from second transition section 332 of knife 300 to a tip 339. At second transition section 332, a width WB of blade 330 begins to decrease as blade 330 extends to tip 339. Blade 330 may include a serrated edge 333 projecting outwardly from left side 304 of blade 330. Serrated edge 333 may include a plurality of teeth 334 inclining downwardly from left side 304 of blade 330. Serrated edge 333 may curve toward longitudinal axis Y of knife 300 as blade 330 extends to tip 339.

The shape of teeth 334 may be configured to provide serrated edge 333 with a sufficient degree of strength to inhibit bending during cutting, while being sharp enough for effectively slicing a food item. For example, as shown in FIG. 23, teeth 334 may each converge at a tip by an angle $\Theta_{KT}$ ranging from approximately 80 degrees to approximately 86 degrees, such as, for example, from approximately 83 degrees to approximately 84 degrees. Increasing the angle $\Theta_{KT}$ of teeth 334 beyond this range may make serrated edge 333 too blunt for effectively cutting a food item. Decreasing the angle $\Theta_{KT}$ of teeth 334 below this range may not provide teeth 334 with enough strength to effectively inhibit bending during the cutting motion. The height and the number of teeth 334 may be increased or decreased to provide teeth 334 a sufficient amount of surface area to effectively cut, rather than slide over the item, during cutting, while still minimizing the force needed to slice serrated edge 333 of blade 330 through the item. For example, the height of teeth $H_T$ 334 may range from approximately 1 mm to approximately 4 mm, such as for example, from approximately 2 mm to approximately 3 mm. The number of teeth 334 along serrated edge 333 may range from 12 teeth to 16 teeth, such as, for example, from 13 teeth to 14 teeth.

Figure 28:
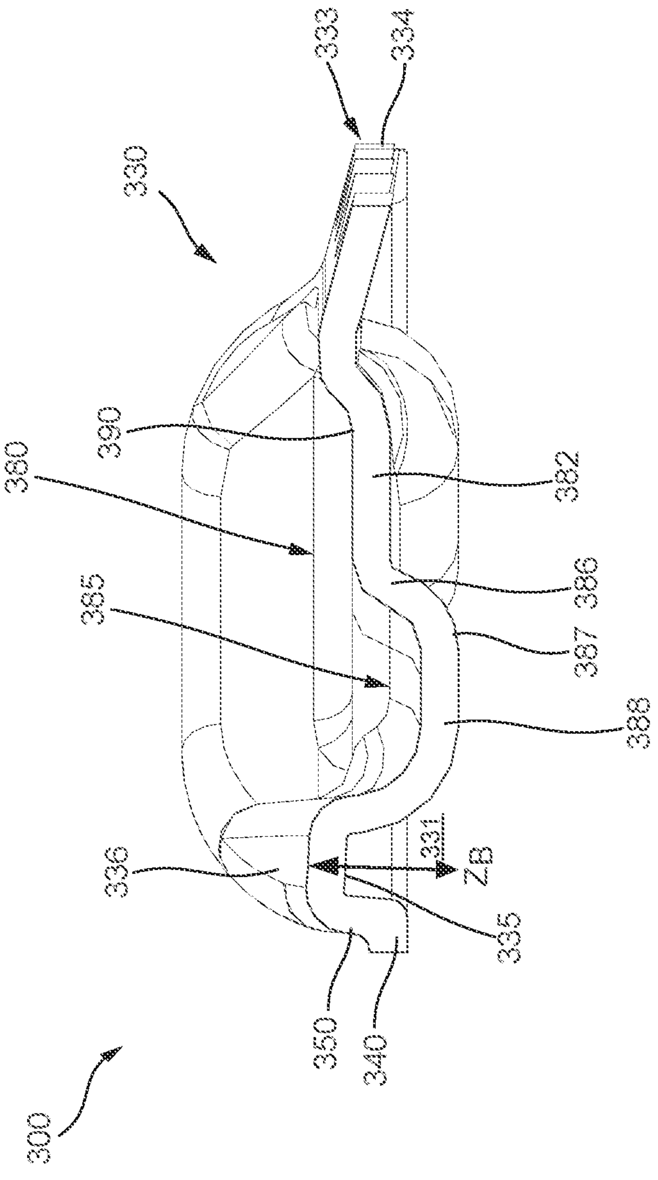
FIG. 28 shows a transverse cross-sectional view of the molded fiber knife of FIG. 21 taken along line 28-28 in FIG. 23.
Figure 29:
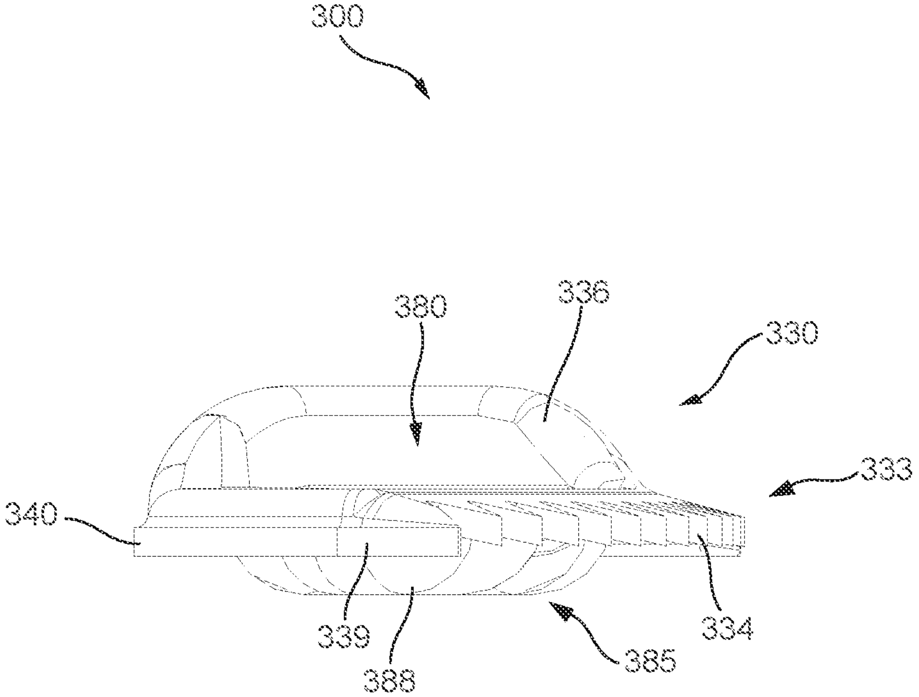
FIG. 29 shows a front view of the molded fiber cutlery of FIG. 21.
Figure 30:
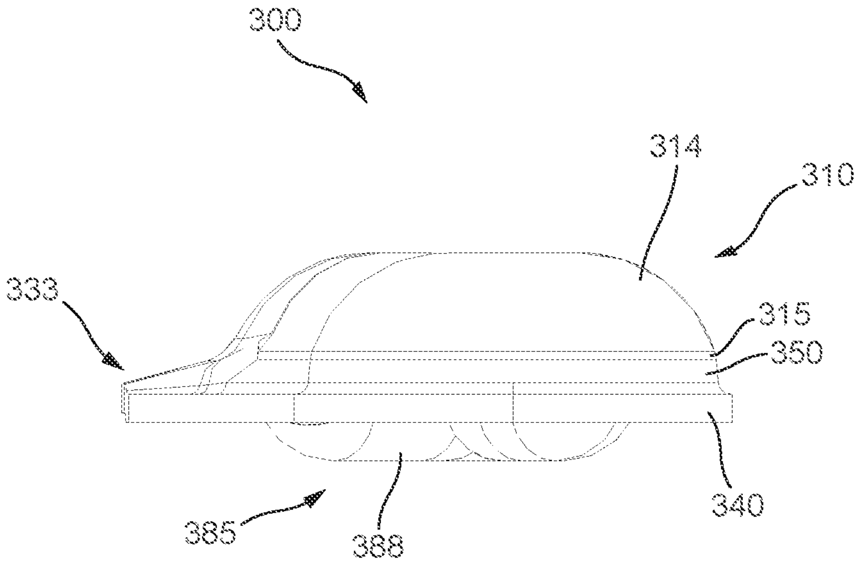
FIG. 30 shows a rear view thereof.

Blade 330 may include a convex-shaped top wall 336 extending across a portion of blade 330 from second transition section 332. At second transition section 332, top wall 336 of blade 330 may extend continuously from top wall 324 of neck 320. Top wall 336 may have a rounded upper surface 337 disposed along a portion of blade 330 adjacent to neck 320 and a flat upper surface 338 disposed along a tip 339 of blade 330. With reference to FIG. 28, a height $Z_B$ of top wall 336 may taper along right side 302 and left side 304 of blade 330. In some embodiments, height $Z_B$ of top wall 336 tapers at a greater degree along left side 304 of blade 330 than along right side 302 of blade 330. Blade 330 may include a concave-shaped bottom wall 335 disposed below top wall 336. At second transition section 332, bottom wall 335 may extend continuously from bottom wall 326 of neck 320. With reference to FIG. 28, top wall 336 and bottom wall 335 may collectively bulge in an upward direction and define a cavity 331 bounded by bottom wall 335.

Flange 340 may continue to extend along right side 302 of blade 330 to tip 339. Flange 340 may be disposed below top wall 336 of blade 330. Along right side 302 of blade 330, flange 340 may be aligned with the portion of the flange 340 disposed along right side 302 of handle 310 and neck 320. Along left side 304 of knife 300, flange 340 terminates at about second transition section 332 proximate to serrated edge 333.

Outer sidewall 350 may continue to extend along right side 302 blade 330 to tip 339. Outer sidewall 350 may extend in a vertical direction from top wall 336 of blade 330 to flange 340. Along right side 302 of neck 320, outer sidewall 350 may be aligned with the portion of the outer sidewall 350 disposed along right side 302 of handle 310 and neck 320. Along left side 304 of knife 300, the height of outer sidewall 350 tapers such that outer sidewall 350 converges with flange 340 at about second transition section 332.

Knife 300 may include an indentation 380 extending along a portion of blade 330 to add stability to knife 300 when a torsional force is applied to blade 330, such as, for example, when using knife 300 to cut content. Indentation 380 may include a concave base 382 disposed below top wall 336 of blade 330. Concave base 382 may include a first end 383 bounded by rounded upper surface 337 of top wall 336 and a second end 384 bounded by flat upper surface 338 of top wall 336. The combination of tapering convex top wall 336 of neck blade 330 and concave base 382 of indentation 380 provide a smooth transition from convex top wall 314 of handle 310 to tip 339 of blade 330, thereby adding stability to blade 330.

Knife 300 may include a plurality of recesses 385 disposed on a right side 302 of base 382 and a left side 304 of base 382. The plurality of recesses 385 of knife 300 may have the same or similar features of recesses 360 disposed along handle 310 to promote the dissipation of forces applied orthogonally to blade 330, thereby increasing the strength and stiffness of blade 330.

For example, with reference to FIG. 28, the plurality of recesses 385 may include a curved inner sidewall 386 extending downwardly from base 382 of indentation 380. Curved inner sidewall 386 may bend toward longitudinal axis Y of knife 300. The plurality of recesses 385 may include a bottom wall 388 extending in a lateral direction from a lower end 387 of curved inner sidewall 386 to convex top wall 336. Bottom wall 388 may be disposed below flange 340. The number and arrangement of recesses 385 disposed along blade 330 may be the same as or similar to the number and arrangement of recesses 360 disposed along handle 310. For example, at least two or more recesses 385 may be disposed on right side 302 of base 382, and at least two or more recesses 385 may be disposed on left side 304 of base 382 so that there is an adequate length of curved surfaces to dissipate applied forces along a significant portion (e.g., 60% to 95%) of blade 330. The plurality of recesses 385 disposed on right side 302 of base 382 may be offset with respect to the plurality of recesses 385 disposed on left side 304 of base 382.

Knife 300 may include a rib 390 formed in concave base 382 by curved inner sidewalls 386 of the plurality of recesses 385. Rib 390 of blade 330 may have the same or similar features of rib 370 of handle 310. Rib 390 may undulate along a length of blade 330 due to the shape of curved inner sidewalls 386. By undulating along the length of blade 330, rib 390 disperses any applied forces in a direction tangential to the curves of rib 390, thereby allowing blade 330 to resist torsion.

In use, the one or more geometric aspects (e.g., recesses 360, rib 370, indentation 380, and rib 390) dissipate applied forces and inhibit torsion such that knife 300 is able to slice content without twisting blade 330 or handle 310.

According to the embodiments described herein, the molded fiber cutlery, including spoon 100, fork 200, and knife 300, may be manufactured by using a laser to cut and/or trim any of the edges (e.g., flange, teeth of serrated edges, tines, curved edges of rib) of the molded fiber cutlery. Compared to a punch of die that can only cut the mold fiber at a single angle, the beam of a laser cutter can be applied at various angles to trim and/or cut the edges of the molded fiber cutlery. By trimming the edges of the molded fiber cutlery at various angles, the laser cutter does not pull any material during the cutting process, thereby preserving the structural integrity of the molded fiber cutlery. Moreover, the laser cutter provides a more precise cut of the one or more geometric aspects of the molded fiber cutlery, described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A biodegradable cutlery comprising:
- a handle having a handle convex top wall and a handle concave bottom wall;
- a neck having a neck convex top wall extending from an end of the handle and a neck concave bottom wall extending from the end of the handle, wherein the handle concave bottom wall and the neck concave bottom wall define a unified concave bottom wall;
- a blade having:
  - a blade convex top wall extending from the neck to a tip of the blade, wherein the blade convex top wall, the neck convex top wall, and the handle convex top wall together define a unified convex top wall,
  - a serrated edge projecting outwardly from the blade convex top wall and defining a first side of the blade, and
  - a base offset from the blade convex top wall, the base and the blade convex top wall defining an indentation, wherein the blade convex top wall extends around the indentation;
- a plurality of handle recesses disposed on one of the handle convex top wall and the concave bottom wall of the handle to disrupt forces applied orthogonally against the handle; and
- a handle rib formed in the handle convex top wall by the handle recesses, wherein the handle, the neck, and the blade are unitary and made of a molded fiber material.

2. The biodegradable cutlery of claim 1, wherein the serrated edge includes a plurality of teeth inclining downwardly from the first side of the blade.

3. The biodegradable cutlery of claim 1, wherein the plurality of handle recesses include a plurality of handle recesses disposed on a right side of the handle convex top wall and a plurality of handle recesses disposed on a left side of the handle convex top wall.

4. The biodegradable cutlery of claim 1, further comprising:
- a plurality of blade recesses disposed on a right side of the base and a plurality of blade recesses disposed on a left side of the base, the plurality of blade recesses disposed on the right and left sides of the base each including a curved inner sidewall extending downwardly from the base and a blade recess bottom wall extending laterally from a lower end of the curved inner sidewall.

5. The biodegradable cutlery of claim 4, further comprising:

a blade rib formed in the base by the curved inner sidewall of the blade recesses, the blade rib undulating along a length of the base.

6. The biodegradable cutlery of claim 4, further comprising:

a flange extending along a perimeter of the handle, the neck, and a second side of the blade.

7. The biodegradable cutlery of claim 6, wherein the blade convex top wall projects upwardly from the flange, and the bottom walls of the blade recesses are disposed below the flange.

8. The biodegradable cutlery of claim 1, wherein the blade convex top wall has a flat portion disposed along the tip of the blade and a rounded portion disposed along an end of the blade adjacent to the neck.

9. The biodegradable cutlery of claim 8, wherein a height of the blade convex top wall tapers from the rounded portion to the flat portion.

* * * * *